United States Patent
Tanno

(10) Patent No.: US 11,890,899 B2
(45) Date of Patent: Feb. 6, 2024

(54) PNEUMATIC TIRE, PNEUMATIC TIRE ASSEMBLY, AND POWER SUPPLY SYSTEM

(71) Applicant: The Yokohama Rubber Co., LTD., Tokyo (JP)

(72) Inventor: Atsushi Tanno, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 522 days.

(21) Appl. No.: 17/271,192

(22) PCT Filed: Aug. 15, 2019

(86) PCT No.: PCT/JP2019/032017
§ 371 (c)(1),
(2) Date: Feb. 24, 2021

(87) PCT Pub. No.: WO2020/040030
PCT Pub. Date: Feb. 27, 2020

(65) Prior Publication Data
US 2021/0245555 A1    Aug. 12, 2021

(30) Foreign Application Priority Data
Aug. 24, 2018 (JP) .................. 2018-157501

(51) Int. Cl.
*B60C 19/00* (2006.01)

(52) U.S. Cl.
CPC ........ *B60C 19/00* (2013.01); *B60C 2019/004* (2013.01)

(58) Field of Classification Search
CPC .............. B60C 19/00; B60C 2019/004; B60C 23/0413; B60C 19/002
(Continued)

(56) References Cited

U.S. PATENT DOCUMENTS

2002/0088517 A1    7/2002   Shimura
2012/0049620 A1    3/2012   Jansen
(Continued)

FOREIGN PATENT DOCUMENTS

CN    101420134    4/2009
CN    106240251    12/2016
(Continued)

OTHER PUBLICATIONS

International Search Report for International Application No. PCT/JP2019/032017 dated Oct. 29, 2019, 4 pages, Japan.

*Primary Examiner* — Rexford N Barnie
*Assistant Examiner* — Xuan Ly
(74) *Attorney, Agent, or Firm* — Thorpe North & Western

(57) ABSTRACT

A pneumatic tire includes a planar-shaped receiver coil in a cavity region, and configured to receive a magnetic field through a carcass ply layer and generate a signal, and an element to receive power converted from the signal. A receiving region of the receiver coil is interposed between an outermost side of a bead core in the radial direction and an innermost side of a belt layer in the radial direction, and the receiving region faces in the width direction. When a maximum dimension of the receiving region along the radial direction of the receiver coil is a length D1, a distance from the receiving region to a nearest portion of the bead core to the receiving region is L1, and a distance from the receiving region to a nearest portion of the belt layer to the receiving region is L2, relationships L1>(D1/4) and L2>(D2/4) are satisfied.

23 Claims, 13 Drawing Sheets

(58) Field of Classification Search
USPC .......................................................... 307/10.1
See application file for complete search history.

(56) References Cited

U.S. PATENT DOCUMENTS

2016/0329749 A1* 11/2016 Yang ................... B60C 23/0413
2018/0205264 A1   7/2018 Akuzawa et al.

FOREIGN PATENT DOCUMENTS

| DE | 10 2014 005 071 | 10/2015 |
| JP | H04-501939 | 4/1992 |
| JP | 2000-255229 | 9/2000 |
| JP | 2002-209343 | 7/2002 |
| JP | 2008-105544 | 5/2008 |
| JP | 2009-018716 | 1/2009 |
| JP | 2010-012837 | 1/2010 |
| JP | 2012-527030 | 11/2012 |
| WO | WO 90/12474 | 10/1990 |
| WO | WO 2005/063512 | 7/2005 |
| WO | WO 2010/131161 | 11/2010 |
| WO | WO 2017/022054 | 2/2017 |
| WO | WO 2017/149600 | 9/2017 |

* cited by examiner

PNEUMATIC TIRE, PNEUMATIC TIRE ASSEMBLY, AND POWER SUPPLY SYSTEM

TECHNICAL FIELD

The present technology relates to a pneumatic tire, a pneumatic tire assembly, and a power supply system that supplies power to an element provided in a pneumatic tire.

BACKGROUND ART

Technology for incorporating an element such as a sensor in a pneumatic tire and monitoring a state of the pneumatic tire has been proposed. For example, to monitor air pressure of a pneumatic tire, there is an internal pressure warning system in which an internal pressure sensor and a transmission device are provided in a tire cavity region, and monitoring results by the internal pressure sensor of internal pressure are wirelessly transmitted from the transmission device to a receiving device in a vehicle side, or a tire deformation behavior measurement system in which an acceleration sensor is provided in an inner circumferential surface side of a tread portion in a tire cavity region, and monitoring results by the acceleration sensor of deformation behavior of the tread portion during rolling of a tire are wirelessly transmitted from a transmission device provided in the tire cavity region to a receiving device in a vehicle side, or the like.

Power is required to drive such a sensor and a transmission device, and the power is supplied, for example, from a battery built in the transmission device. However, since the power supplied by the battery is limited, the sensor and the transmission device cannot be driven semipermanently, and complicated processing of disassembling a pneumatic tire mounted on a wheel from the wheel and replacing an exhausted battery in a tire cavity region is required.

In contrast, technology for providing a tire that includes a built-in electric circuit and that can provide a stable power supply to the electric circuit, and a power supply structure to the tire is known (Japan Unexamined Patent Publication No. 2000-255229).

In the above-described technology, the electric circuit that receives power to be driven, and a secondary coil connected to the electric circuit are provided in the tire for an automobile, and an inverter connected to a power supply of a vehicle, and a primary coil that is disposed in a portion opposing the tire of a vehicle main body, and that is energized by the inverter are provided in the vehicle main body of the automobile.

In the above-described technology, a plurality of the secondary coils provided in the tire cavity region are embedded adjacent to each other in an entire periphery of an inner circumferential surface of a sidewall of the tire (FIG. 5 of Japan Unexamined Patent Publication No. 2000-255229).

However, it has been found that in such placement of the secondary coils, transmission efficiency is low and power cannot be supplied sufficiently to the transmission device and the sensor.

SUMMARY

To increase transmission efficiency, in a case where power is wirelessly supplied with use of a magnetic field, a secondary coil (receiver coil) is preferably disposed in consideration of placement of a steel material used in a pneumatic tire.

The present technology provides a pneumatic tire, a pneumatic tire assembly, and a power supply system applied to the pneumatic tire including a receiver coil that can provide a power supply with higher transmission efficiency than in the related art, in supplying power to an element provided in the pneumatic tire.

An aspect of the present technology is a pneumatic tire including a receiver coil configured to generate power by receiving an AC (alternating current) magnetic field from an outside of the pneumatic tire. The pneumatic tire includes a pair of bead cores each formed in an annular shape of a bead cord made from steel, a carcass ply layer formed of an organic fiber cord, the carcass ply layer being wound about each of the bead cores and folded back to have a toroidal shape, a belt layer provided in an outer side of the carcass ply layer in a tire radial direction and formed of a belt cord made from steel, and a receiver coil formed in a planar shape and provided in a tire cavity region of the pneumatic tire, the receiver coil including a receiving region formed in a planar shape and configured to receive an AC magnetic field transmitted through the carcass ply layer, the receiver coil being configured to generate an AC signal by receiving the AC magnetic field.

As the receiver coil is viewed from one side in a tire width direction, a surface of the receiving region of the receiver coil being provided in a region along the tire radial direction interposed between a first portion located in an outermost side of the bead cord in the tire radial direction and a second portion located in an innermost side of the belt layer in the tire radial direction, and the surface of the receiving region facing in the tire width direction. When a maximum dimension of the receiving region along the tire radial direction of the receiver coil is a length $D1$, a distance from the receiving region of the receiver coil to a nearest portion of one of the bead cores to the receiving region of the receiver coil is a distance $L1$, and a distance from the receiving region of the receiver coil to a nearest portion of the belt layer to the receiving region of the receiver coil is a distance $L2$, the receiver coil being disposed away from the bead core and the belt layer and the distance $L1$ and the distance $L2$ being greater than a distance of one-fourth the length $D1$.

Preferably, when a distance along the tire radial direction between the first portion and the second portion is a distance $L3$, the length $D1$ is 30% or greater of the distance $L3$.

Preferably, when a maximum dimension of the receiving region of the receiver coil along a tire circumferential direction is a length $D2$, the length $D2$ is greater than the length $D1$.

Preferably, when a tire region as the pneumatic tire is viewed from the tire radial direction is divided into four sections in the tire width direction, a placement position of the receiver coil is located in an outermost divided region at one side in the tire width direction.

Preferably, a plurality of receiver coils each corresponding to the receiver coil are disposed respectively in a plurality of locations in the tire circumferential direction and are separated from each other in the tire circumferential direction and aligned in an entire circumference in the tire circumferential direction, and a separation distance between receiver coils adjacent in the tire circumferential direction of the plurality of receiver coils is smaller than the length $D1$.

Preferably, the receiver coil is an element in which a signal line is formed in a spiral shape in a surface of a flexible substrate, and the flexible substrate is provided in a tire inner circumferential surface of the pneumatic tire or in the tire cavity region.

Preferably, the flexible substrate to be provided in the tire inner circumferential surface is a curved substrate formed conforming to a shape of the tire inner circumferential surface, and the signal line is formed in the curved substrate.

Preferably, the receiver coil is provided in a tire inner circumferential surface of the pneumatic tire, and a region along the tire radial direction of a portion of the receiver coil that is fixed to the tire inner circumferential surface is not overlapped with a position in the tire radial direction of a folded back end of a portion of the carcass ply layer in which the carcass ply layer is folded back around the bead core.

Preferably, the receiver coil is provided via a base material fixed to a tire inner circumferential surface of the pneumatic tire, and a region along the tire radial direction of a portion of the base material that is fixed to the tire inner circumferential surface is separated from the receiving region of the receiver coil, and is not overlapped with a position in the tire radial direction of a folded back end of a portion in which the carcass ply layer is folded back around the bead core.

Preferably, the receiver coil is provided in woven fabric. A portion of warp threads and a portion of weft threads of the woven fabric are formed of conductive thread, and a signal line of the receiver coil is formed with the conductive thread.

Preferably, a sound absorptive member is provided in the tire cavity region of the pneumatic tire, and
the receiver coil is provided in a side surface or inside of the sound absorptive member.

Preferably, the length $D1$ is 10 to 50% of a tire cross-sectional height $SH$ of the pneumatic tire.

Another aspect of the present technology is a pneumatic tire assembly of a pneumatic tire mounted on a wheel, the pneumatic tire assembly including an element configured to receive power by receiving an AC magnetic field from an outside of the pneumatic tire.

The pneumatic tire includes a pair of bead cores each formed in an annular shape of a bead cord made from steel, a carcass ply layer formed of an organic fiber cord, the carcass ply layer being wound about each of the bead cores and folded back to have a toroidal shape, and a belt layer provided in an outer side of the carcass ply layer in a tire radial direction and formed of a belt cord made from steel. The wheel includes a receiver coil formed in a planar shape and provided being fixed to a wheel surface facing a tire cavity region of the pneumatic tire, the receiver coil including a receiving region formed in a planar shape and configured to receive an AC magnetic field transmitted through the carcass ply layer, the receiver coil being configured to generate an AC signal.

The pneumatic tire or the wheel includes an element fixed to the wheel surface facing the tire cavity region or to a tire inner circumferential surface of the pneumatic tire, the element being configured to receive power converted from the AC signal and be driven by the power.

As the receiver coil is viewed from one side in a tire width direction, a surface of the receiving region of the receiver coil is provided in a region along the tire radial direction interposed between a first portion located in an outermost side of the bead cord in the tire radial direction and a second portion located in an innermost side of the belt layer in the tire radial direction, and the surface of the receiving region faces in the tire width direction. When a maximum dimension of the receiving region along the tire radial direction of the receiver coil is a length $D1$, a distance from the receiving region of the receiver coil to a nearest portion of one of the bead cores to the receiving region of the receiver coil is a distance $L1$, and a distance from the receiving region of the receiver coil to a nearest portion of the belt layer to the receiving region of the receiver coil is a distance $L2$, the receiver coil being disposed away from the bead core and the belt layer and the distance $L1$ and the distance $L2$ being greater than a distance of one-fourth the length $D1$.

Yet another aspect of the present technology is a power supply system configured to wirelessly transmit power from a transmitter unit to a receiver unit provided in a pneumatic tire and supply power to an element provided in the receiver unit.

The transmitter unit includes a transmitter coil provided in a base portion non-rotational with respect to the pneumatic tire, the transmitter coil including a transmission region configured to generate and transmit an AC magnetic field. The pneumatic tire includes a pair of bead cores each formed in an annular shape of a steel bead cord, a carcass ply layer formed of an organic fiber cord, the carcass ply layer being wound about each of the bead cores and folded back to have a toroidal shape, and a belt layer provided in an outer side of the carcass ply layer in a tire radial direction and formed of a steel belt cord.

The receiver unit is provided in the pneumatic tire. The receiver unit includes a receiver coil formed in a planar shape and provided in a tire cavity region of the pneumatic tire, the receiver coil including a receiving region formed in a planar shape and configured to receive the AC magnetic field transmitted through the carcass ply layer, the receiver coil being configured to generate an AC signal by receiving the AC magnetic field, and an element configured to receive power converted from the AC signal and be driven by the power.

As the receiver coil is viewed from one side in a tire width direction, a surface of the receiving region of the receiver coil is provided in a region in the tire radial direction interposed between a first portion located in an outermost side of the bead cord in the tire radial direction, and a second portion located in an innermost side of the belt layer in the tire radial direction, and the surface of the receiving region faces in the tire width direction. When a maximum dimension of the receiving region along the tire radial direction of the receiver coil is a length $D1$, a distance from the receiving region of the receiver coil to a nearest portion of one of the bead cores to the receiving region of the receiver coil is a distance $L1$, and a distance from the receiving region of the receiver coil to a nearest portion of the belt layer to the receiving region of the receiver coil is a distance $L2$, the receiver coil being disposed away from the bead core and the belt layer and the distance $L1$ and the distance $L2$ being greater than a distance of one-fourth the length $D1$.

Preferably, when a length of a dimension along the tire radial direction of the transmission region of the transmitter coil is a length $D3$, the length $D3$ is greater than the length $D1$.

Preferably, when a length of a dimension along the tire circumferential direction of the transmission region of the transmitter coil is a length $D4$, and a maximum dimension of the receiving region along the tire circumferential direction of the receiver coil is a length $D2$, the length $D4$ is smaller than the length $D2$.

Preferably, a plurality of receiver coils each corresponding to the receiver coil are disposed respectively in a plurality of locations in the tire circumferential direction to be separated from each other in the tire circumferential direction and aligned in an entire circumference in the tire circumferential direction, and a separation distance between the receiver coils adjacent in the tire circumferential direction of the plurality of receiver coils is smaller than the length D4 of the dimension along the tire circumferential direction of the transmission region of the transmitter coil.

Preferably, a ratio d/SH of a separation distance d between the transmission region of the transmitter coil and the pneumatic tire to a tire cross-sectional height SH of the pneumatic tire is 0.05 or greater and 0.6 or less.

Preferably, when a height of a position of the transmitter coil from a ground with which the pneumatic tire comes into contact is a height H, and a maximum outer diameter of the pneumatic tire is a maximum outer diameter Dmax, a ratio (H/Dmax) of the height H to the maximum outer diameter Dmax and an aspect ratio α [%] of the pneumatic tire satisfy the following formula (1), $-7.707 \cdot (\alpha/100)^3 + 12.17 \cdot (\alpha/100)^2 - 4.875 \cdot (\alpha/100) + 0.642 < H/Dmax < 1$, where α is 30 or greater and less than 75,     Formula (1):

$0.067 < H/Dmax < 1$, where α is less than 30, and $0.580 < H/Dmax < 1$, where α is 75 or greater.

Preferably, a resonant frequency at a circuit of the transmitter unit matches a resonant frequency at a circuit of the receiver unit.

Preferably, wireless transmission of power from the transmitter unit to the receiver unit is performed by a magnetic field resonance method.

Preferably, the transmitter coil is provided at a position opposing a side portion of the pneumatic tire in an unsprung region of a suspension of a vehicle on which the pneumatic tire is mountable.

Additionally, the single transmitter coil is preferably provided per the pneumatic tire, as an only transmitter.

According to the above-described pneumatic tire, the above-described pneumatic tire assembly, and the above-described power supply system, in supplying power to an element provided in the pneumatic tire, transmission efficiency of supply of power can be higher than in the related art.

DETAILED DESCRIPTION

A pneumatic tire, a pneumatic tire assembly, and a power supply system that supplies power to an element provided in a pneumatic tire according to an embodiment will be described below with reference to the drawings.

Figure 1:
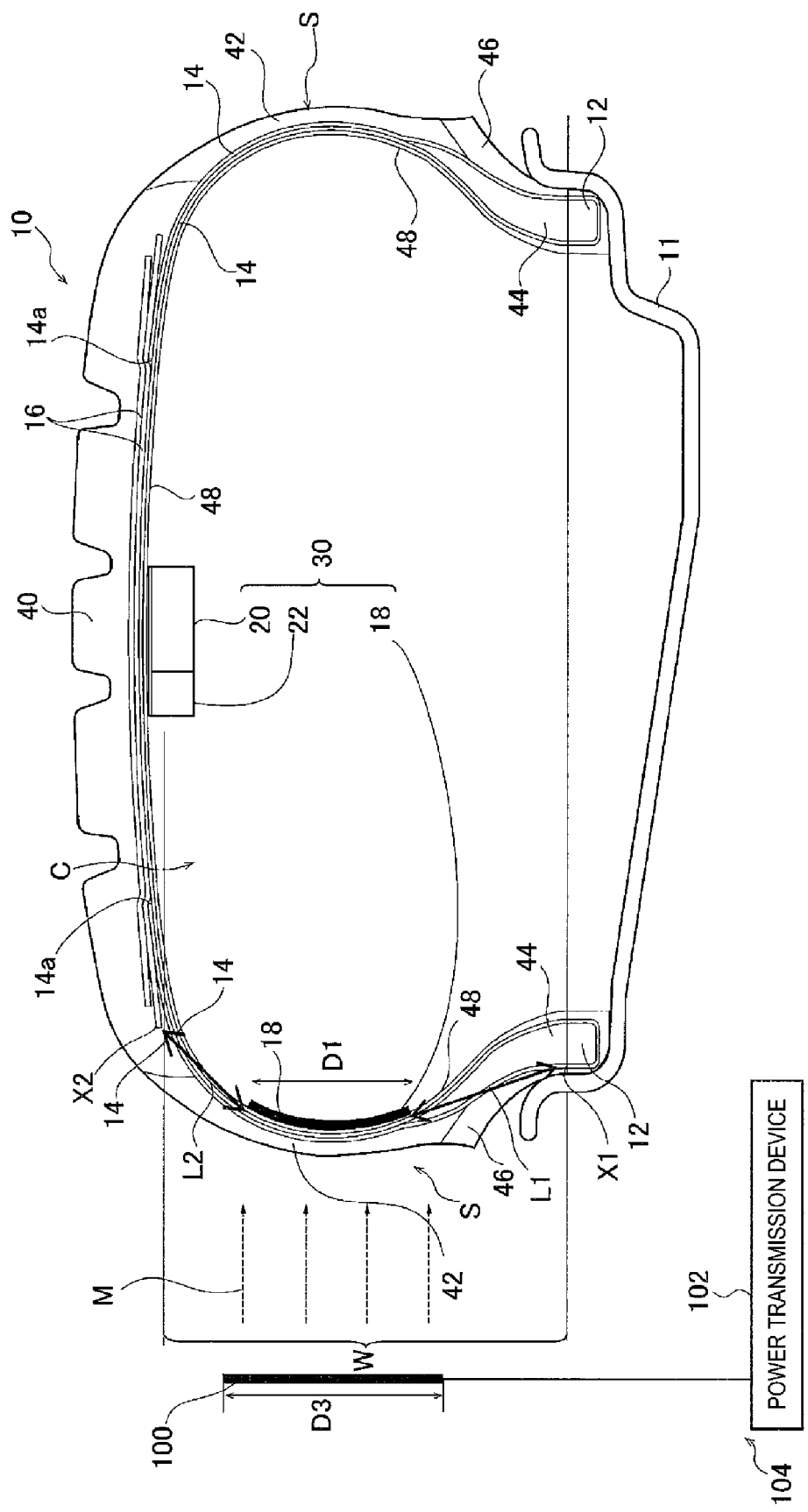
FIG. 1 is a diagram illustrating an example of a cross-section of a pneumatic tire assembly according to an embodiment.

FIG. 1 is a diagram illustrating an example of a cross-section of a pneumatic tire and a pneumatic tire assembly. A pneumatic tire 10 illustrated in FIG. 1 includes, as a backbone portion, a pair of bead cores 12, a carcass ply layer 14, and a belt layer 16. The pneumatic tire 10 is mounted on a wheel 11 to form a pneumatic tire assembly. In FIG. 1, a portion (a rim bottom surface, a rim flange) of the wheel 11 is illustrated.

Each of the bead cores 12 is an annular member formed of a bead cord made from steel and wound in multiple stages in the tire circumferential direction.

The carcass ply layer 14 is a member formed of an organic fiber cord and wound about each of the bead cores 12 and folded back to have a toroidal shape. In the carcass ply layer 14, the organic fiber cord is provided extending in the tire radial direction or the tire width direction. The pneumatic tire 10 illustrated in FIG. 1 is formed of the single carcass ply layer 14. However, a plurality of the carcass ply layers may have a toroidal shape.

The belt layer 16 is provided in an outer side of the carcass ply layer 14 in the tire radial direction and is formed of a belt cord made from steel. The belt layer 16 is formed of two multi-layered belts, and the steel cords are inclined in different directions from each other with respect to the tire circumferential direction to form a crossing layer.

Tread rubber 40, side rubber 42, bead filler rubber 44, rim cushion rubber 46, and innerliner rubber 48 are provided around the backbone portion. The side rubber 42, the bead filler rubber 44, and the rim cushion rubber 46 are curved in the outer side of the bead core 12 in the tire radial direction in a shape protruding in an outer side in the tire width direction to form a side portion S.

The pneumatic tire 10 further includes a receiver coil 18, a sensor 20, and a communication device 22. The receiver coil 18, the sensor 20, and the communication device 22 serve as a receiver unit 30 that receives power from the outside of the tire by wireless transmission.

The receiver coil 18 is provided in a tire cavity region C of the pneumatic tire 10. The receiver coil 18 includes a receiving region that is formed in a planar shape and that receives an AC magnetic field transmitted through the side rubber 42 of the side portion S and the carcass ply layer 14. The receiver coil 18 receives the AC magnetic field to generate an AC signal according to the AC magnetic field. The tire cavity region C is a region that is surrounded by a tire inner circumferential surface and the rim bottom surface of the wheel 11 on which the tire is mounted, and that is filled with air to a predetermined internal pressure. In the example illustrated in FIG. 1, the receiver coil 18 is provided along the tire inner circumferential surface facing the tire cavity region C. At least one or more receiver coils 18 are provided.

The sensor 20 is an element that is supplied with power converted from the AC signal generated by the receiver coil 18 and that is driven by the power. The sensor 20 is not particularly limited, but is, for example, an acceleration sensor that measures deformation behavior of a tread portion of the pneumatic tire 10 during rolling.

The communication device 22 is a portion that wirelessly transmits information about monitoring results measured by the sensor 20 to a communication device (not illustrated) in the outside of the tire, and is also an element that receives power converted from the generated AC signal to be driven by the power.

An electric power line not illustrated and extending from the receiver coil 18 is connected to a processing circuit provided in the communication device 22. The AC signal generated by the receiver coil 18 is directed through the electric power line to the processing circuit and rectified to be converted to DC power. The DC power is applied to drive power of the sensor 20 and drive power of the communication device 22 (power for signal processing, transmission, or the like).

The AC magnetic field received by the receiver coil 18 is generated by a transmitter unit 104 including, for example, a power transmission device 102 and a transmitter coil 100 which are illustrated in FIG. 1. The transmitter unit 104 is provided in a base non-rotational with respect to rotation of the pneumatic tire 10, for example, a non-rotational portion (for example, knuckle) of a suspension. The transmitter unit 104 generates an AC signal by an inverter provided in the transmitter unit 104, and generates an AC magnetic field in a transmission region of the transmitter coil 100.

According to an embodiment, transmission of power from the transmitter unit 104 to the receiver unit 30 is performed by a magnetic field resonance method. In the magnetic field resonance method, a resonant frequency at a circuit of the transmitter unit 104 is caused to match a resonant frequency at a circuit of the receiver unit 30, and thus an AC magnetic field generated at the transmitter coil 100 resonates with the receiver coil 18. In other words, an AC current flows through the receiver coil 18 due to resonance, and the AC current is rectified, and thus DC power can be obtained.

In the magnetic field resonance method, transmission efficiency of power is higher than in a magnetic induction method, and a transmission distance of dozens of centimeters is also greater than a transmission distance of a few centimeters in the magnetic induction method. From this point, the resonant frequency of the transmitter unit 104 and the resonant frequency of the receiver unit 30 preferably match each other. Adjustment of the resonant frequency is performed, for example, by adjusting capacitance or inductance in resonant circuits of the transmitter unit 104 and the receiver unit 30.

Note that in a case where the magnetic induction method and the magnetic field resonance method are used, disturbance of an AC magnetic field due to the presence of a conductive material at or near a transmission path of the AC magnetic field is not preferable from a point of transmission efficiency. From this point, a placement position of the receiver coil 18 is limited as described below. In particular, since the resonant frequency at the circuit of the transmitter unit 104 and the resonant frequency at the circuit of the receiver unit 30 match each other in the magnetic field resonance method, disturbance of an AC magnetic field due to the presence of the conductive material is not preferable, as compared with the related art.

The receiver coil 18 is provided in the tire cavity region C. Specifically, as the receiver coil 18 is viewed from one side in the tire width direction, for example, from the left side on the sheet of FIG. 1, the receiver coil 18 is provided in a region W in the tire radial direction, and a surface of the receiving region faces in the tire width direction. The region W is a region interposed between a first portion X1 (see FIG. 1) located in an outermost side of the bead cord of the bead core 12 in the tire radial direction and a second portion X2 (see FIG. 1) located in an innermost side of the belt layer 16 in the tire radial direction. Accordingly, an AC magnetic field passing through the side rubber 42 and the carcass ply layer 14 can be received efficiently in the receiving region of the receiver coil 18.

At this time, when the maximum dimension of the receiving region along the tire radial direction of the receiver coil 18 is a length D1 (see FIG. 1), and the distance from the receiving region of the receiver coil 18 to a nearest portion of the bead core 12 to the receiving region of the receiver coil 18 is a distance L1, and the distance from the receiving region of the receiver coil 18 to a nearest portion of the belt layer 16 to the receiving region of the receiver coil 18 is a distance L2, the receiver coil 18 is disposed away from the first portion X1 and the second portion X2, and the distance L1 and the distance L2 are greater than a distance of one-fourth the length D1. In the example illustrated in FIG. 1, the nearest portion of the bead core 12 to the receiving region of the receiver coil 18 is the first portion X1, and the nearest portion of the belt layer 16 to the receiving region of the receiver coil 18 is the second portion X2.

In this way, the receiver coil 18 is disposed being separated by the above-described distance from the bead core 12 and the belt layer 16, and thus power can be supplied with high transmission efficiency. Reception by the receiver coil 18 of an AC magnetic field disturbed by the steel cords of the belt layer 16 and the bead core 12 is not preferable from a point of transmission efficiency. In particular, in the case where transmission is made by the magnetic field resonance method, to efficiently cause resonance, disturbance of an AC magnetic field by the steel cords of the belt layer 16 and the bead core 12 is not preferable from a point of ensuring desired transmission efficiency and a desired transmission distance.

Figure 2:
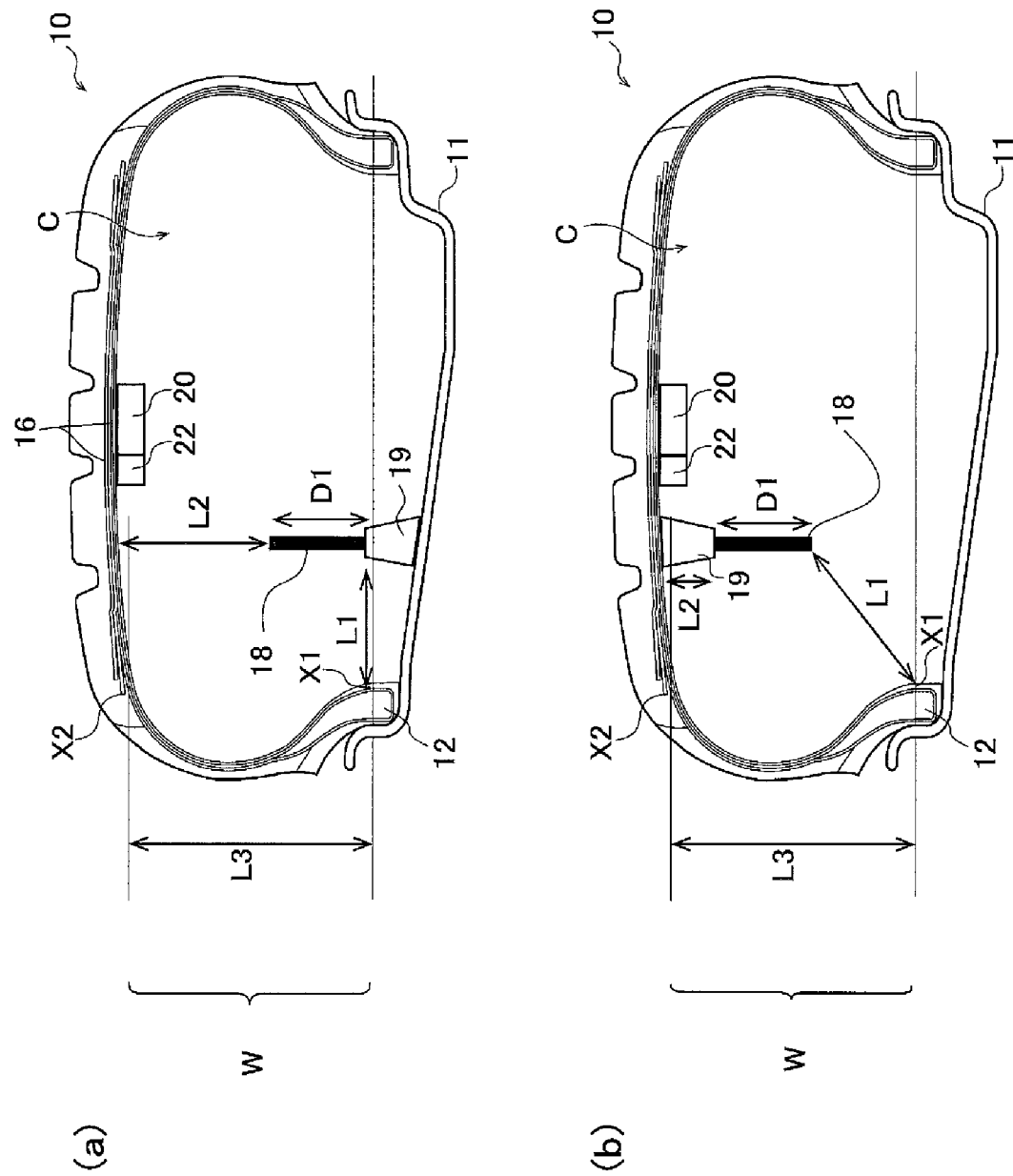
FIGS. 2A and 2B are diagrams illustrating examples of placement different from the placement of a receiver coil illustrated in FIG. 1.

FIGS. 2A and 2B are diagrams illustrating examples of placement different from the placement of the receiver coil 18 illustrated in FIG. 1. The pneumatic tire 10 or the wheel 11 includes the sensor 20 and the communication device 22 (elements) that are fixed to a wheel surface facing the tire cavity region C or to the tire inner circumferential surface of the pneumatic tire 10 and that are supplied with power converted from an AC signal to be driven by the power.

The example illustrated in FIG. 2A is an example in which the receiver coil 18 is provided standing in the tire cavity region C via a base 19 fixed to the rim bottom surface (wheel surface) of the wheel 11. The sensor 20 and the communication device 22 (elements) are provided in the tire inner circumferential surface. Other portions are identical to those in the example illustrated in FIG. 1, and thus descriptions of these portions will be omitted. The transmitter unit 104 is not illustrated in FIG. 2A. The sensor 20 and the communication device 22 may be fixed to the wheel surface.

The receiver coil 18 is, for example, formed in a planar shape on a hard substrate and extends in the tire circumferential direction (in a direction perpendicular to the sheet of FIG. 2A). Similarly, in this example, as the receiver coil 18 is viewed from the tire width direction, a surface of the receiving region of the receiver coil 18 is provided in the region W (see FIG. 2A) in the tire radial direction that is interposed between the first portion X1 (see FIG. 2A) located in the outermost side of the bead cord of the bead core 12 in the tire radial direction and the second portion X2 (see FIG. 2A) located in the innermost side of the belt layer 16 in the tire radial direction, and the surface of the receiving region faces in the tire width direction. Accordingly, an AC magnetic field passing through the side rubber 42 and the carcass ply layer 14 can be received efficiently in the receiving region.

At this time, when the maximum dimension of the receiving region along the tire radial direction of the receiver coil 18 is the length D1 (see FIG. 2A), and the distance from the receiving region of the receiver coil 18 to the nearest portion of the bead core 12 to the receiving region of the receiver coil 18 is the distance L1, and the distance from the receiving region of the receiver coil 18 to the nearest portion of the belt layer 16 to the receiving region of the receiver coil 18 is the distance L2, the receiver coil 18 is disposed being separated by the above-described distance from the bead core 12 and the belt layer 16, and the distance L1 and the distance L2 are greater than a distance of one-fourth the length D1. Similarly, in this case, power can be supplied with high transmission efficiency.

Note that the base 19 illustrated in FIG. 2A can be fixed to the rim bottom surface with an adhesive or the like.

The example illustrated in FIG. 2B is an example in which the receiver coil 18 is provided standing in the tire cavity region C via the base 19 fixed to the tire inner circumferential surface of the tire cavity region C. The sensor 20 and the communication device 22 (elements) are provided in the tire inner circumferential surface. Other portions are identical to those in the example illustrated in FIG. 1, and thus descriptions of these portions will be omitted. The transmitter unit 104 is not illustrated in FIG. 2B. The sensor 20 and the communication device 22 may be fixed to the wheel surface.

The receiver coil 18 includes a configuration identical to the configuration illustrated in FIG. 2A. Similarly, in this example, as the receiver coil 18 is viewed from one side in the tire width direction, for example, from the left side on the sheet of FIG. 2B, a surface of the receiving region of the receiver coil 18 is provided in the region W (see FIG. 2B) in the tire radial direction that is interposed between the first portion X1 (see FIG. 2B) located in the outermost side of the bead cord of the bead core 12 in the tire radial direction and the second portion X2 (see FIG. 2B) located in the innermost side of the belt layer 16 in the tire radial direction, and the surface of the receiving region faces in the tire width direction. Accordingly, an AC magnetic field passing through the side rubber 42 and the carcass ply layer 14 can be received efficiently in the receiving region.

At this time, the receiver coil is disposed being separated by the above-described distance from the bead core 12 and the belt layer 16, and the distance L1 and the distance L2 are greater than a distance of one-fourth the length D1. Similarly, in this case, power can be supplied with high transmission efficiency.

Note that, for example, a surface fastener provided prior to vulcanization in a side of the tire inner circumferential surface of the tread portion, and vulcanized to be integrated with the pneumatic tire 10 is connected to a surface fastener provided in the base 19, and thus the base 19 illustrated in FIG. 2B can be fixed to the tire inner circumferential surface.

Additionally, the method for fixing the base 19 is not limited to the method using the surface fasteners, and may be a known fixing method.

In the pneumatic tire assembly in which the pneumatic tire 10 is mounted on the wheel 11 as illustrated in FIG. 1 or FIGS. 2A and 2B, a power supply system that wirelessly transmits power from the transmitter unit 104 to the receiver unit 30 provided in the pneumatic tire 10 and that supplies power to the sensor 20 and the communication device 22 (elements) is formed.

The transmitter unit 104 includes the transmitter coil 100 provided in a portion non-rotational with respect to the pneumatic tire 10, and including the transmission region that generates and transmits an AC magnetic field.

The receiver unit 30 is provided in the pneumatic tire 10.

Specifically, the receiver unit 30 includes the receiver coil 18, the sensor 20, and the communication device 22 (elements). The receiver coil 18 is provided in the tire cavity region C of the pneumatic tire 10. The receiver coil 18 includes a receiving region that is formed in a planar shape and that receives an AC magnetic field transmitted by the transmitter coil 100 and transmitted through the carcass ply layer 14, and the receiver coil 18 generates an AC signal.

In the power supply system, the receiver coil 18 is provided in the region W in the tire radial direction, and the surface of the receiving region faces in the tire width direction. The receiver coil 18 is disposed away from the bead core 12 and the belt layer 16, and the distance L1 and the distance L2 are greater than a distance of one-fourth the length D1. Thus, an AC magnetic field received by the receiver coil 18 is not disturbed by influence of the bead cord and the belt cord made from steel of the bead core 12 and the belt layer 16, and thus an AC signal can be generated efficiently. As a result, transmission efficiency of supply of power can be made higher than in the related art.

When the distance along the tire radial direction of the region W illustrated in FIG. 1 and FIGS. 2A and 2B (distance along the tire radial direction between the first portion X1 and the second portion X2) is L3 (see FIGS. 2A and 2B), the length D1 (see FIG. 1, FIGS. 2A and 2B) is preferably 30% or greater of the distance L3. From a point of increasing a transmission distance, the length D1 is preferably made as large as possible in the range where an AC magnetic field is not affected by the steel cords.

Figure 3A:
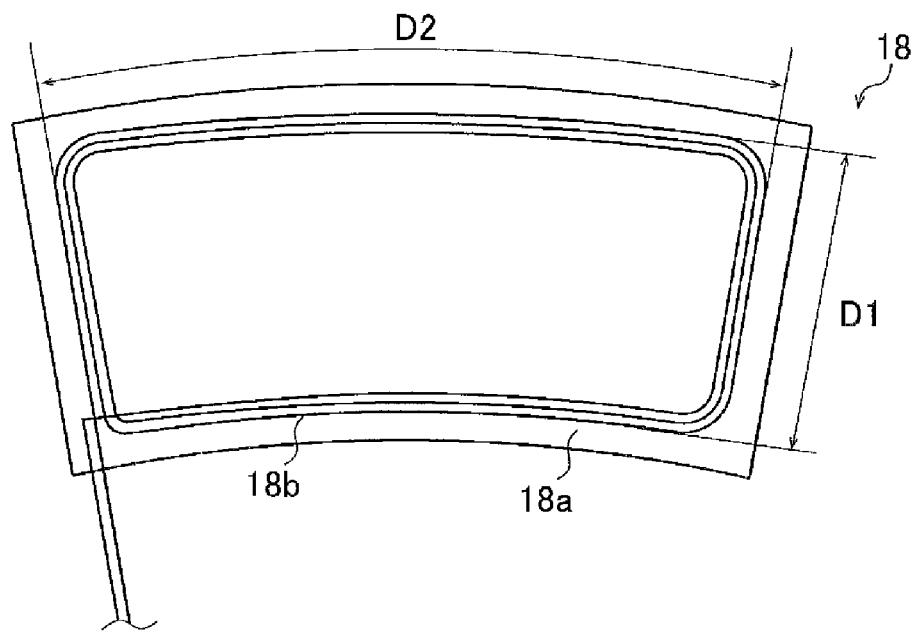
FIGS. 3A and 3B are diagrams illustrating, in a plan view, a receiver coil provided in a pneumatic tire according to an embodiment.
Figure 3B:
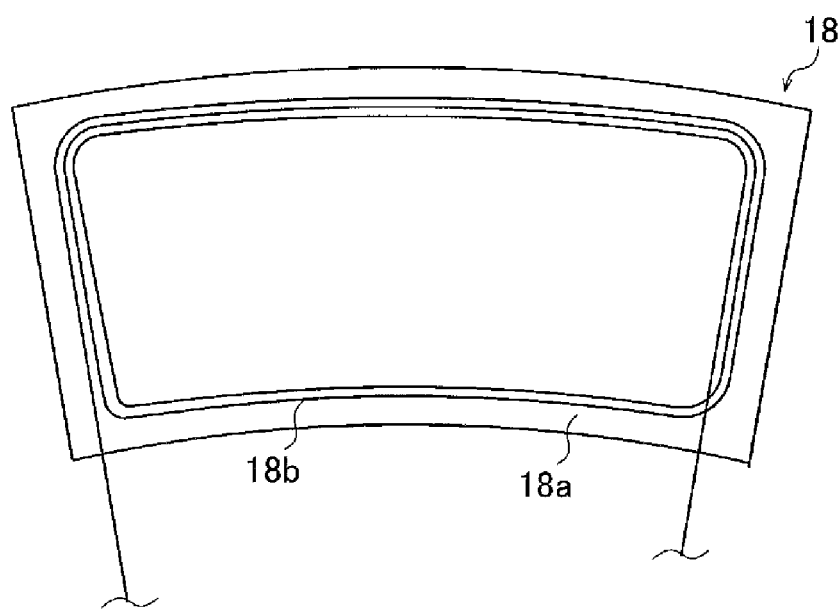

FIGS. 3A and 3B are drawings illustrating, in a plan view, the receiver coil 18. The receiver coil 18 is a coil obtained by forming a signal line 18b in a spiral shape (helical shape) in a non-magnetic substrate 18a. As illustrated in FIG. 3A, an input end and an output end of the signal line 18b may be provided in an identical side of the non-magnetic substrate 18a (one side of the left and right sides of FIG. 3A), or as illustrated in FIG. 3B, may be provided in different sides of the non-magnetic substrate 18a. Metal vapor deposition or Chemical Vapor Deposition (CVD) is performed with use of a predetermined mask, or screen printing is performed, and thus a conductor material may be formed in a linear shape on the non-magnetic substrate 18a to obtain the signal line 18b.

In the example illustrated in FIG. 1, the receiver coil 18 is provided in a curved portion of the tire inner circumferential surface of the side portion S, and thus a flexible substrate made from a resin is preferably used as the non-magnetic substrate 18a.

In other words, according to an embodiment, the receiver coil 18 is an element in which the signal line 18b is formed in a spiral shape in a surface of a flexible substrate, and the flexible substrate is preferably provided in the tire inner circumferential surface or in the tire cavity region C of the pneumatic tire 10. Accordingly, even when the receiver coil 18 is deformed in the tire cavity region C, the receiver coil 18 can be prevented from separating from the tire inner circumferential surface or can be prevented from being damaged.

Additionally, according to an embodiment, preferably, the flexible substrate to be provided in the tire inner circumferential surface is a curved substrate formed conforming to the shape of the tire inner circumferential surface, and the signal line 18b is formed in the curved substrate. Since the flexible substrate is formed in a curved shape in advance to conform to the shape of the tire inner circumferential surface, a planar flexible substrate is not required to be deformed into a curved shape to conform to the tire inner circumferential surface. Thus, at the time of providing the receiver coil 18 in the tire inner circumferential surface, strain is not applied to the receiver coil 18, and a decrease in the durability of the receiver coil 18, and a decrease in power supply efficiency due to the receiver coil 18 can be suppressed.

In such a receiver coil 18, when the maximum dimension of the receiving region along the tire circumferential direction of the receiver coil 18 is a length D2 (see FIG. 3A), the length D2 is preferably greater than the length D1. The length D1 is limited by the region W while the length D2 is not limited in the tire circumferential direction. The length D2 is set to be long, and thus the receiving region is increased. Thus, an AC magnetic field generated at the transmitter coil 100 can be received in the receiving region as much as possible, and a large amount of power can be supplied.

Figure 4:
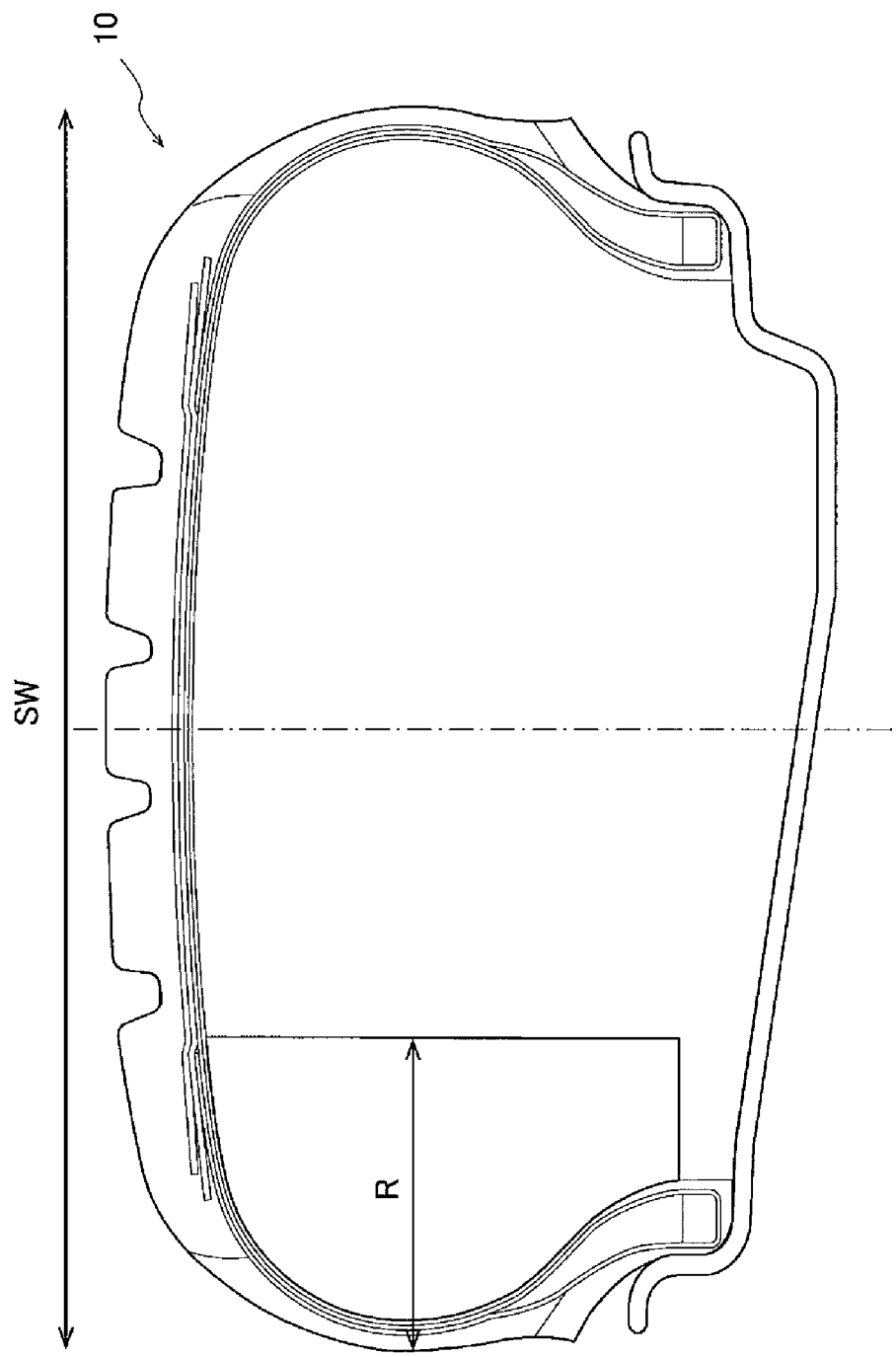
FIG. 4 is a diagram explaining a placement region in a tire width direction of a receiver coil provided in a pneumatic tire according to an embodiment.

According to an embodiment, as illustrated in FIG. 4, when a tire region as the pneumatic tire 10 is viewed from the tire radial direction (region between tire maximum width positions in both sides in the tire width direction) is divided into four sections in the tire width direction, a placement position of the receiver coil 18 is preferably in a divided region R outermost in one side in the tire width direction. FIG. 4 is a diagram explaining a placement region in the tire width direction of the receiver coil 18 provided in a pneumatic tire according to an embodiment. The receiver coil 18 is provided in the divided region R, and thus the distance to the transmitter coil 100 can be made small, and transmission efficiency can be improved. Accordingly, the receiver coil 18 is preferably provided in the divided region R and in the range of the region W (see FIG. 1, FIGS. 2A and 2B). When the pneumatic tire 10 is a tire directed to be mountable with one side of the tire facing a vehicle inner side, the divided region R is positioned in the side portion S side that is designated to be in the vehicle inner side.

Figure 5A:
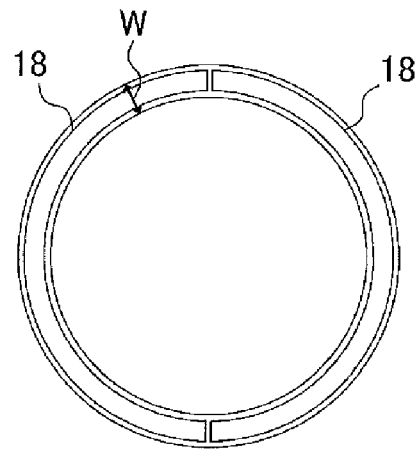
FIGS. 5A to 5C are diagrams explaining an embodiment of a placement in a tire circumferential direction of a receiver coil provided in a pneumatic tire according to an embodiment.
Figure 5B:
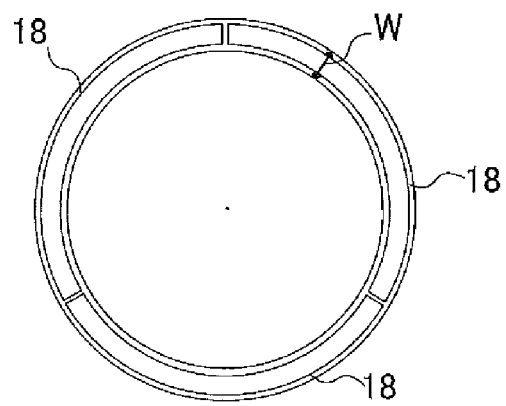
Figure 5C:
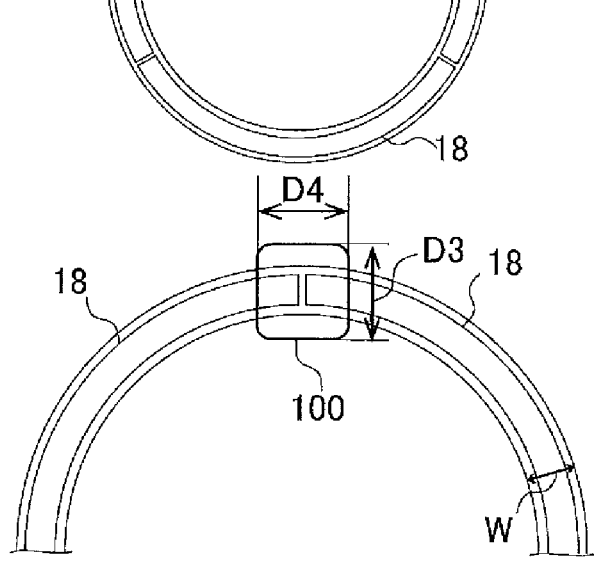

FIGS. 5A to 5C are diagrams illustrating an embodiment of a placement in the tire circumferential direction of the receiver coil 18. FIGS. 5A to 5C each illustrate a contour of an outermost portion of the signal line 18b of the receiver coil 18 for clearly explaining the placement along the tire circumferential direction of the receiver coil 18.

As illustrated in FIGS. 5A to 5C, the receiver coil 18 is provided in each of a plurality of regions divided in the tire circumferential direction.

In other words, a plurality of the receiver coils 18 are disposed away from each other in the tire circumferential direction and aligned in an entire circumference in the tire circumferential direction. In the example illustrated in FIG. 5A, the receiver coil 18 is provided in each of two locations divided in the tire circumferential direction. In the example illustrated in FIG. 5B, the receiver coil 18 is provided in each of three locations divided in the tire circumferential direction.

In this way, the entire circumference of the tire is divided into a plurality of regions, and the receiver coil 18 is disposed in each of the divided locations. Such a placement is made due to the following reason. In a case where the receiver coil 18 is provided in the tire inner circumferential surface, the tire inner circumferential surface in which the receiver coil 18 is provided is a portion corresponding to the side portion S where vertical deflection deformation and release of vertical deflection deformation repeatedly occur during rolling of the pneumatic tire 10. A portion subjected to the vertical deflection deformation and a portion not subjected to the vertical deflection deformation are present in the side portion S in the tire circumferential direction. In a case where the single receiver coil 18 is provided in the entire circumference of the tire, a portion deformed due to the vertical deflection deformation and a portion not subjected to the vertical deflection deformation are present in the receiver coil 18. Thus, the receiver coil 18 is likely to separate from the tire inner circumferential surface. Accordingly, the entire circumference of the tire is divided into a plurality of regions, and the receiver coil 18 is disposed in each of the divided regions, and thus the receiver coil 18 can be prevented from separating from the tire inner circumferential surface. From this point, the entire circumference of the tire is preferably divided into two to eight sections in the tire circumferential direction.

In this case, the separation distance between the receiver coils adjacent in the tire circumferential direction is preferably smaller than the length D1. When the pneumatic tire 10 stops rolling, the separation distance between the receiver coils adjacent is preferably reduced to make an AC magnetic field generated by the transmitter coil 100 less frequently pass through a region between the receiver coils adjacent. From this point, the separation distance between the receiver coils adjacent in the tire circumferential direction is preferably much smaller than the length D1 that is limited by the region W. In other words, the plurality of receiver coils 18 are preferably disposed to be separated from each other in the tire circumferential direction and aligned in the entire circumference in the tire circumferential direction, and the separation distance between the receiver coils adjacent in the tire circumferential direction is preferably smaller than the length D1. However, when the separation distance is excessively small, interference of a magnetic field occurs, and thus transmission efficiency is likely to decrease. From this point, the separation distance is preferably greater than a distance of one-tenth the length D1.

According to an embodiment, as illustrated in FIG. 5C, the separation distance between the receiver coils 18 adjacent in the tire circumferential direction is preferably smaller than a length D4 of the dimension along the tire circumferential direction of the transmission region of the transmitter coil 100. Even in a case where the pneumatic tire 10 stops and as illustrated in FIG. 5C, a gap between the receiver coils 18 adjacent opposes the transmission region of the transmitter coil 100, the separation distance between the receiver coils 18 adjacent is smaller than the length D4. Thus, an AC magnetic field can be received by the two receiver coils 18 adjacent. Thus, even in a case where the pneumatic tire 10 stops in the state illustrated in FIG. 5C, supply of power can be maintained.

Additionally, according to an embodiment, when the length of the dimension along the tire radial direction of the transmission region of the transmitter coil 100 is a length D3, the length D3 is preferably greater than the length D1. In a case where the receiver coil 18 is provided in the tire inner circumferential surface as illustrated in FIG. 1, the degree of curve of the side portion S decreases due to centrifugal force when the pneumatic tire 10 rotates at high speed, and a position of the receiver coil 18 shifts in an outer side in the tire radial direction. Similarly, in this case, since the length D3 of the transmission region of the transmitter coil 100 is greater than the length D1, a portion of an AC magnetic field can be prevented from departing from the receiving region of the receiver coil 18.

According to an embodiment, when the length of the dimension along the tire circumferential direction of the transmission region of the transmitter coil 100 is a length D4, and the maximum dimension of the receiving region along the tire circumferential direction of the receiver coil 18 is the length D2 (see FIG. 3A), the length D4 is preferably smaller than the length D2. Accordingly, an AC magnetic field generated by the transmitter coil 100 can be received by the single receiver coil 18 without leakage in the tire circumferential direction, and thus an amount of power supplied to the element can be increased.

According to an embodiment, considering that the separation distance between the above-described receiver coils 18 adjacent becomes too small to cause interference of a magnetic field and thus transmission efficiency is likely to reduce, the receiver coils 18 adjacent in the tire circumferential direction are preferably provided at different positions in the tire width direction. In this case, the receiver coils 18 adjacent are disposed by the separation distance that is not too small in the tire width direction. Moreover, the receiving regions of the receiver coils 18 provided at different positions in the tire width direction and adjacent in the tire circumferential direction may partially be overlapped with each other in the tire circumferential direction. A predetermined separation distance is ensured in the tire width direction. Thus, even when the receiving regions of the receiver coils 18 adjacent in the tire circumferential direction are partially overlapped with each other in the tire circumferential direction, a decrease in transmission efficiency due to interference of a magnetic field does not occur.

Figure 6A:
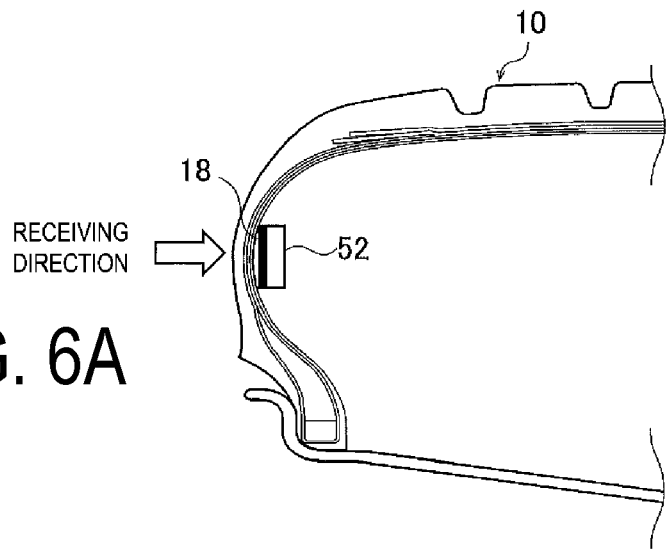
FIGS. 6A to 6C are diagrams explaining an example of a receiver coil provided in a pneumatic tire according to an embodiment.
Figure 6B:
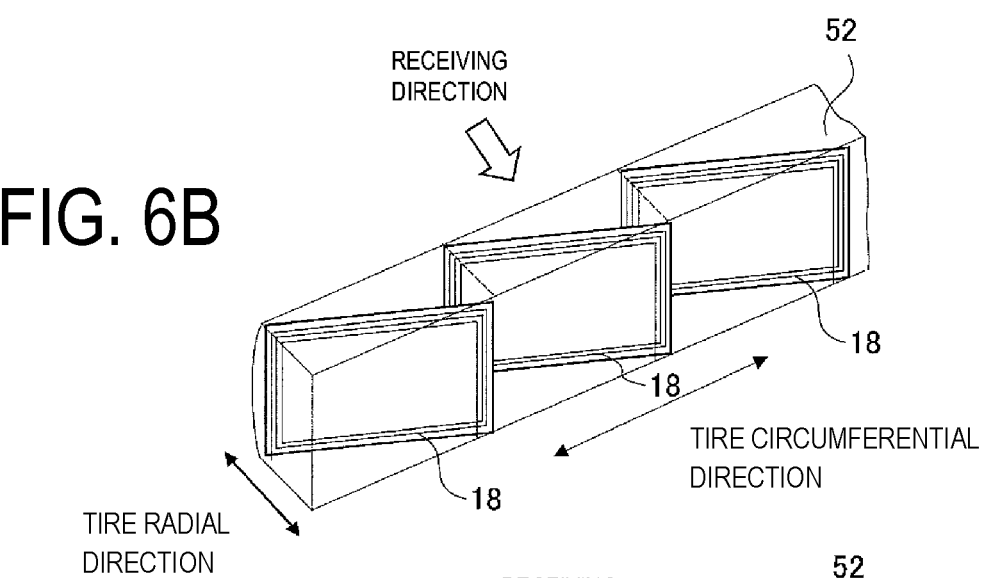
Figure 6C:
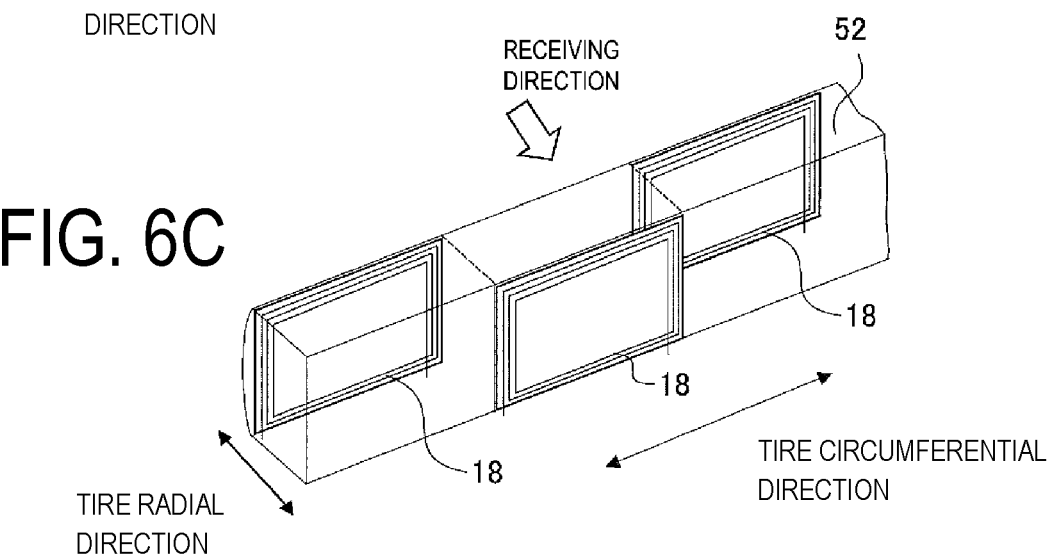

FIGS. 6A to 6C are diagrams explaining an example of the receiver coil 18 provided in the pneumatic tire 10 according to an embodiment.

As illustrated in FIG. 6A, the receiver coil 18 is disposed in a member 52 such as foamed urethane foam that can easily deform. The member 52 is fixed to an inner surface of the pneumatic tire 10.

FIGS. 6B and 6C are diagrams explaining an example of placement of the receiver coil 18 in the member 52. The receiver coil 18 is provided in the non-magnetic substrate 18a and is disposed being fixed to the member 52.

In the example illustrated in FIG. 6B, the receiver coil 18 is inclined toward an inner side in the tire width direction with respect to the tire circumferential direction of the pneumatic tire 10. In the example illustrated in FIG. 6C, the receiver coil 18 is provided in parallel along the tire circumferential direction of the pneumatic tire 10, but the receiver coils 18 adjacent in the tire circumferential direction are alternately disposed at different positions in the tire width direction.

Figure 7A:
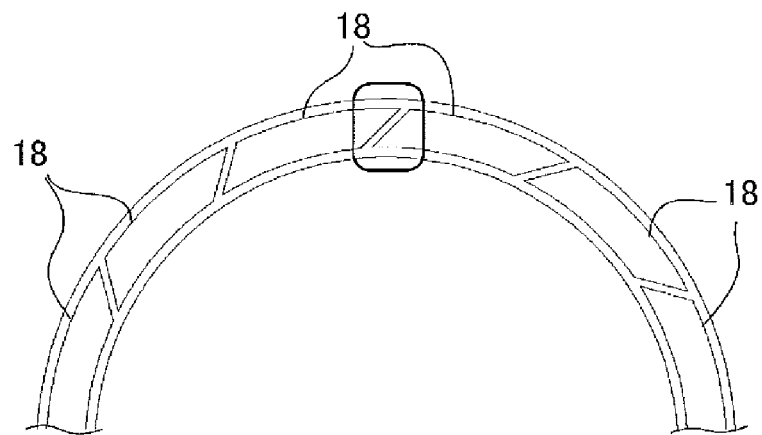
FIGS. 7A and 7B are diagrams explaining another example of an embodiment of placement along the tire circumferential direction of a receiver coil provided in a pneumatic tire according to an embodiment.
Figure 7B:
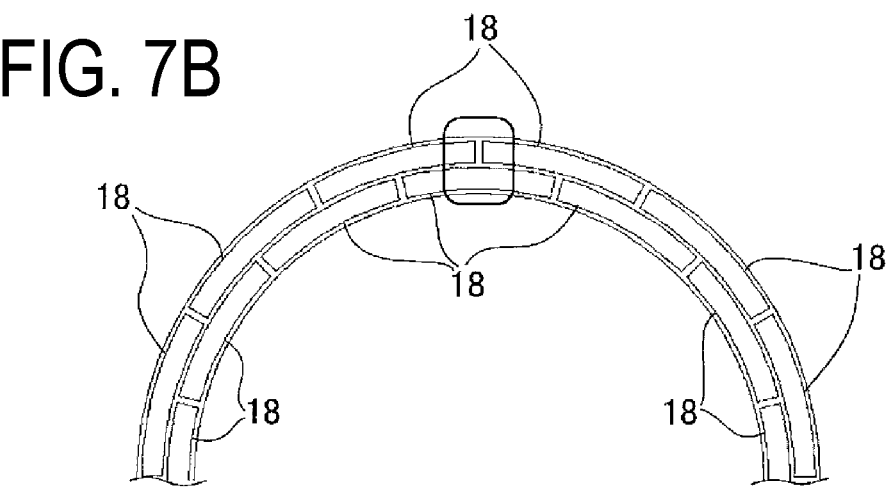

FIGS. 7A and 7B are diagrams explaining another example of an embodiment of placement along the tire circumferential direction of the receiver coil 18 provided in a pneumatic tire according to an embodiment. As with FIGS. 5A to 5C, FIGS. 7A and 7B illustrate a contour of an outermost portion of the signal line 18b of the receiver coil 18 for clearly explaining the placement along the tire circumferential direction of the receiver coil 18.

In the example illustrated in FIG. 7A, sides of contours of the receiver coils 18 adjacent are parallel to each other and are inclined in the tire circumferential direction. In this way, the sides of the contours of the receiver coils 18 adjacent are inclined in the tire circumferential direction. Accordingly, an amount of an AC magnetic field received by the receiver coil 18 in the receiving region moderately decreases during rotation of the pneumatic tire 10, and amounts of an AC magnetic field received by the receiver coils 18 adjacent in the receiving regions moderately increase. Thus, fluctuation of the AC signal obtained at the receiver coil 18 and then fluctuation of power transmitted are suppressed.

In the example illustrated in FIG. 7B, two rows of the receiver coils 18 are formed in the tire radial direction, and the two rows of the receiver coils 18 are disposed with gaps between the receiver coils 18 adjacent in the tire circumferential direction that are not overlapped with each other in the tire circumferential direction between the two rows of the receiver coils 18. Thus, even in a case where, for example, an upper row of the rows of the receiver coils 18 that receive an AC magnetic field switches from one to another in the tire circumferential direction, a lower row of the receiver coils 18 that receive an AC magnetic field does not switch from one to another, and thus fluctuation in power is suppressed. In particular, in the case of a tire having a high flat ratio, the embodiment illustrated in FIG. 7B is preferably used.

Figure 8B:
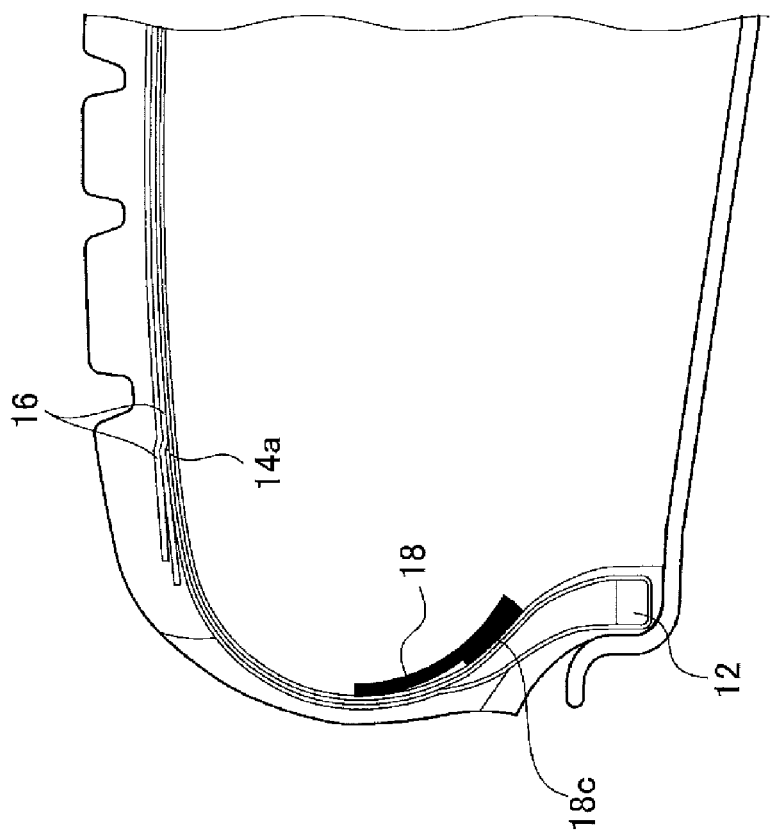
FIGS. 8A and 8B are diagrams explaining an example of fixation of a receiver coil provided in a pneumatic tire according to an embodiment.
Figure 8A:
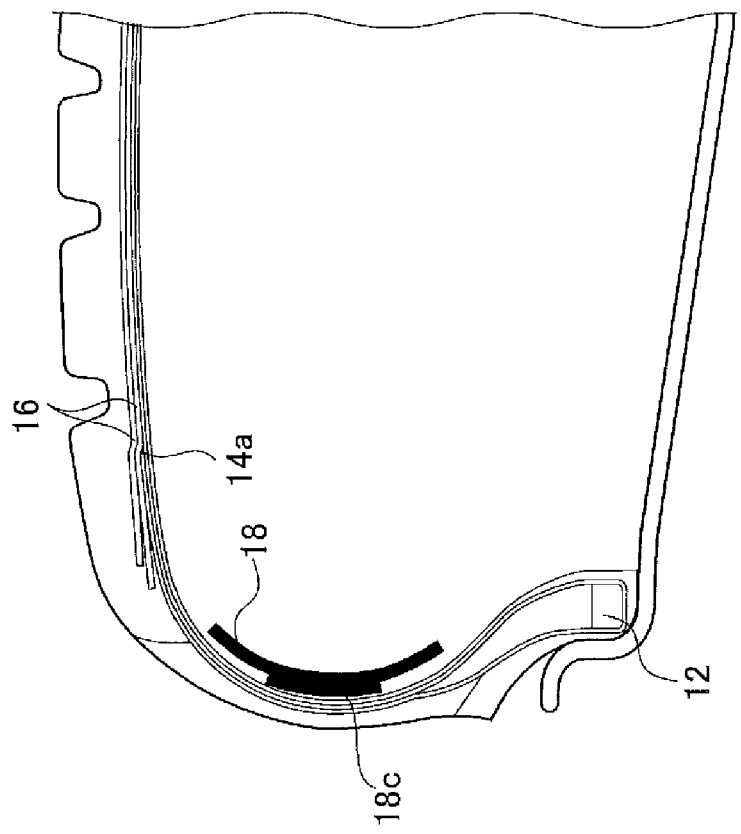

FIGS. 8A and 8B are diagrams illustrating an example of fixation of the receiver coil 18 provided in a pneumatic tire according to an embodiment. As illustrated in FIG. 8A, in a case where the receiver coil 18 is provided in the tire inner circumferential surface, a region in the tire radial direction of a portion fixed to the tire inner circumferential surface of the receiver coil 18 is preferably not overlapped with a position in the tire radial direction of a folded back end 14a of a portion folded back around the bead core 12 of the carcass ply layer 14. In the example illustrated in FIG. 8A, the position of the folded back end 14a is in the placement region in the tire width direction of the belt layer 16, but may be in a region of the side portion S. In particular, in a case where the position of the folded back end 14a is in the side portion S, rigidity changes rapidly in a region around the folded back end 14a of the carcass ply layer 14. Thus, a large difference in vertical deflection deformation may occur in the region around the folded back end 14a. As a result, large strain is likely to be generated. Thus, the region in the tire radial direction of the portion fixed to the tire inner circumferential surface of the receiver coil 18 is not overlapped with the position in the tire radial direction of the folded back end of the portion folded back around the bead core 12 of the carcass ply layer 14. Accordingly, application of unnecessary vertical deflection or strain to the receiver coil 18 can be inhibited, and separation of the receiver coil 18 from the tire inner circumferential surface can be prevented.

For example, the receiver coil 18 is provided via a base material 18c in the tire inner circumferential surface. The base material 18c is fixed to the tire inner circumferential surface. In this case, as illustrated in FIG. 8B, a region in the tire radial direction of a portion fixed to the tire inner circumferential surface of the base material 18c is separated from the receiving region of the receiver coil 18, and further, is preferably not overlapped with a position in the tire radial direction of the folded back end 14a of a portion folded back around the bead core 12 of the carcass ply layer 14. The receiving region of the receiver coil 18 can be prevented from being deformed via the base material 18c due to the influence of vertical deflection deformation from the bead portion (a portion including the bead filler rubber 44) to the side portion S of the pneumatic tire 10. As with the base 19 illustrated in FIGS. 2A and 2B, a surface fastener provided prior to vulcanization in a side of the tire inner circumferential surface of the bead portion, and vulcanized to be integrated with the pneumatic tire 10 is connected to a surface fastener provided in the base material 18*c*, and thus the base material 18*c* can be fixed to the tire inner circumferential surface. An adhesive can also be used instead of the surface fasteners. In a case where the receiver coil 18 is obtained by forming the signal line 18*b* in the non-magnetic substrate 18*a* as illustrated in FIGS. 3A and 3B, the non-magnetic substrate 18*a* may be fixed via an adhesive or the like to the base material 18*c*. Additionally, the signal line 18*b* may be provided directly on the base material 18*c*.

Figure 9A:
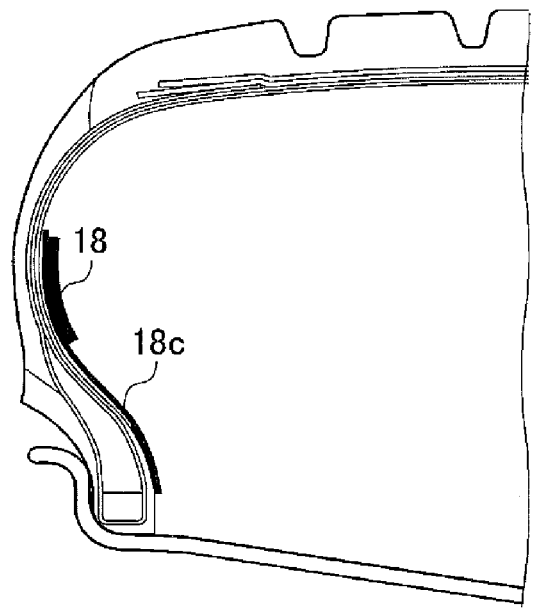
FIGS. 9A and 9B are diagrams explaining fixation of a receiver coil provided in a pneumatic tire according to an embodiment to a tire inner circumferential surface.
Figure 9B:
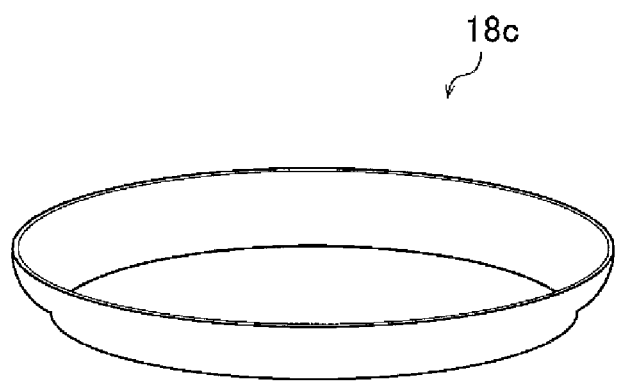

FIGS. 9A and 9B are diagrams explaining fixation of the receiver coil 18 provided in a pneumatic tire according to an embodiment to the tire inner circumferential surface. As illustrated in FIG. 9B, the base material 18*c* is an annular member conforming to a shape of the tire inner circumferential surface. For example, a surface fastener provided prior to vulcanization in a portion of the tire inner circumferential surface corresponding to the bead portion, and vulcanized to be integrated with the bead portion is connected to a surface fastener provided in the base material 18*c*, and thus the base material 18*c* is fixed to the tire inner circumferential surface. The base material 18*c* is formed of, for example, rubber or a resin. Similarly, in the case illustrated in FIGS. 9A and 9B, a region in the tire radial direction of a portion fixed to the tire inner circumferential surface of the base material 18*c* is separated from the receiving region of the receiver coil 18, and further, is preferably not overlapped with a position in the tire radial direction of the folded back end 14*a* of the portion folded back around the bead core 12 of the carcass ply layer 14. The base material 18*c* has a shape conforming to a shape of the tire inner circumferential surface, and the receiver coil 18 is provided in the base material 18*c*. Thus, the receiver coil 18 is provided along the shape of the tire inner circumferential surface. Thus, the receiver coil 18 can be disposed reliably at a position separated by a predetermined distance or greater from the belt layer 16 and the bead core 12 in the region W. Additionally, at the time of mounting the pneumatic tire 10 on the wheel 11, the base material 18*c* including the receiver coil 18 can be placed easily in the tire cavity region C and fixed to the tire inner circumferential surface. In a case where the receiver coil 18 is obtained by forming the signal line 18*b* in the non-magnetic substrate 18*a* as illustrated in FIGS. 3A and 3B, the non-magnetic substrate 18*a* may be fixed via an adhesive or the like to the base material 18*c*. Additionally, the signal line 18*b* may be provided directly on the base material 18*c*.

Figure 10:
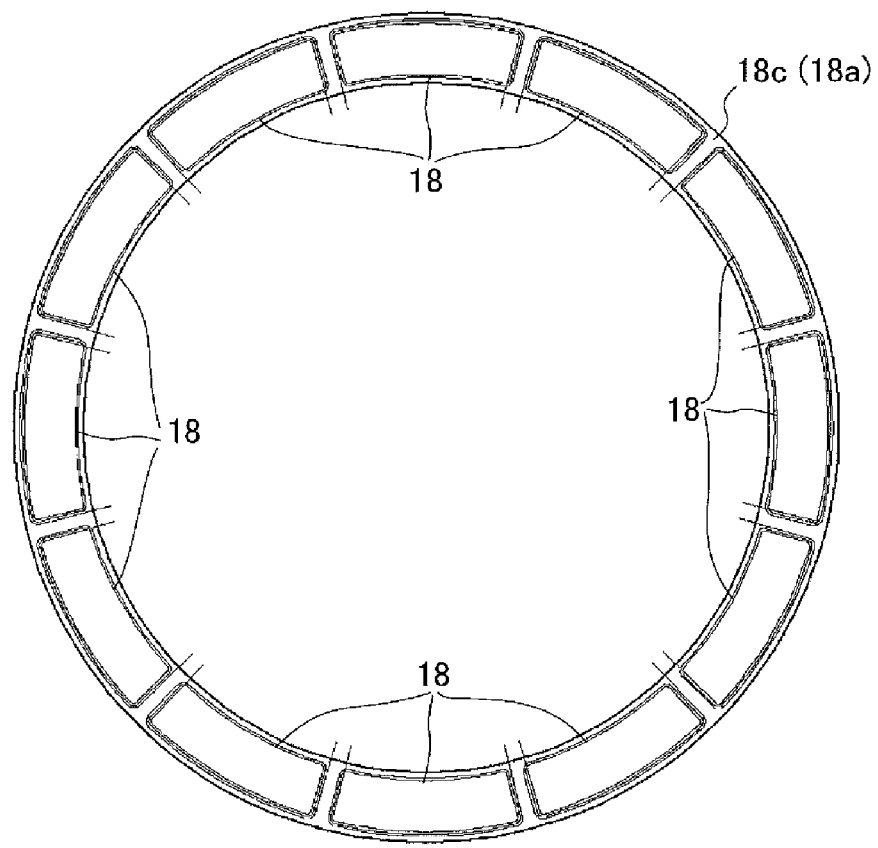
FIG. 10 is a diagram explaining an example of a receiver coil provided in a pneumatic tire according to an embodiment.

FIG. 10 is a diagram explaining an example of the receiver coil 18 provided in a pneumatic tire according to an embodiment. In the example illustrated in FIG. 10, the receiver coil 18 is provided in the base material 18*c* having a ring shape or in the non-magnetic substrate 18*a*. According to such a configuration, when the receiver coil 18 is provided in the individual base material 18*c* or the individual non-magnetic substrate 18*a*, the receiver coil 18 moves in the tire radial direction by centrifugal force when the tire rotates or deforms under force. However, as illustrated in FIG. 10, a plurality of the receiver coils 18 are integrally provided in an annular shape in the base material 18*c* or the non-magnetic substrate 18*a*, and thus movement or deformation of the receiver coil 18 is suppressed.

Figure 11:
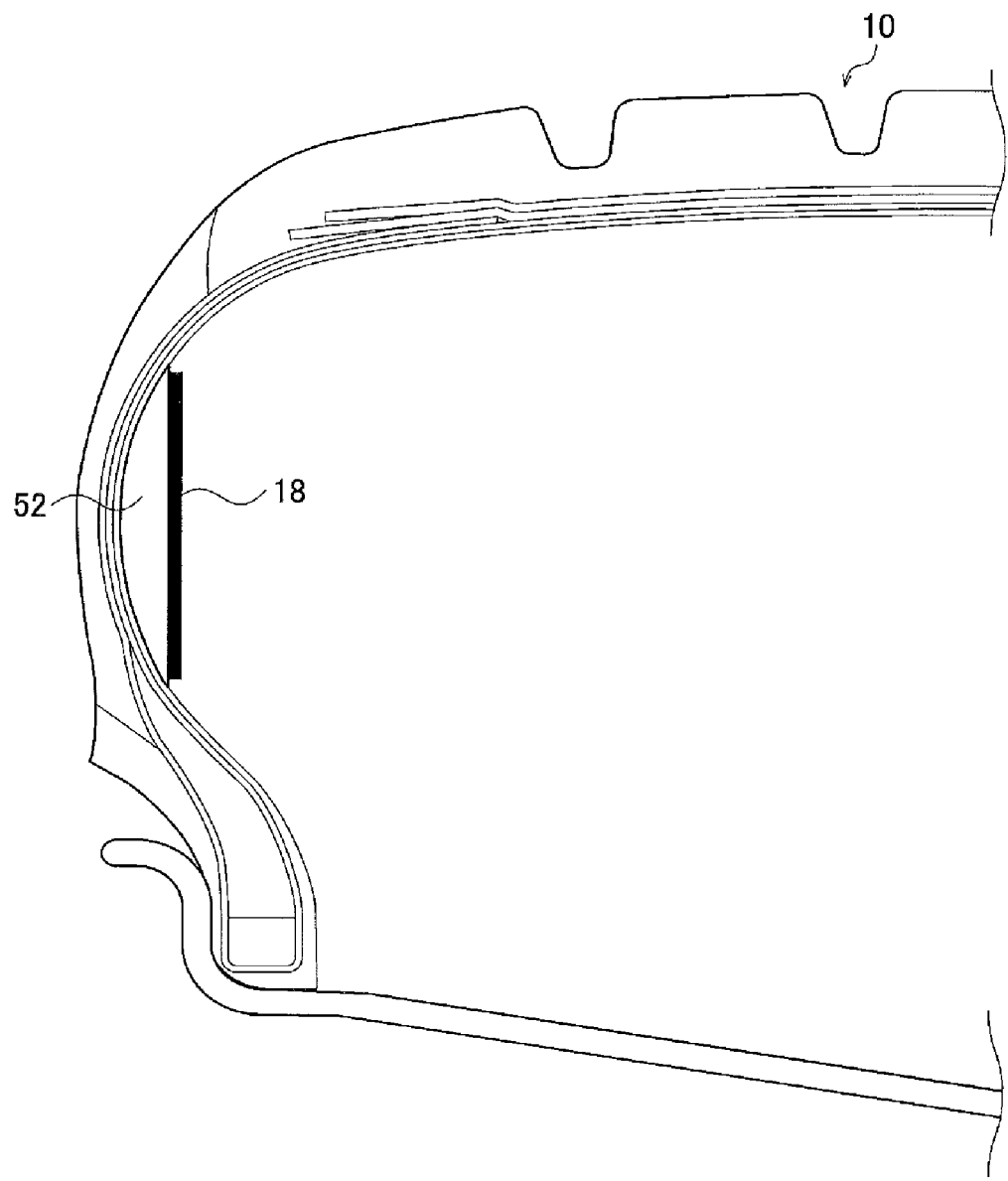
FIG. 11 is a diagram of an example of a receiver coil provided in a pneumatic tire according to an embodiment.

FIG. 11 is a diagram illustrating an example of the receiver coil 18 provided in a pneumatic tire according to an embodiment. A flexible member 52 such as foamed urethane foam is fixed to an inner surface of the pneumatic tire 10, and the receiver coil 18 is bonded and fixed to a surface in an inner side of the member 52 in the tire width direction. The surface facing the inner side of the member 52 in the tire width direction has curvature smaller than the curvature of an inner surface of the side portion S, and is preferably a flat surface. Accordingly, the non-magnetic substrate 18*a* of the receiver coil 18 provided in this surface has curvature smaller than the curvature of the inner surface of the side portion S, and is preferably provided forming a flat surface.

The member 52 preferably has the following physical properties not to inhibit deformation of the side portion S.
  Density: from 5 to 40 [kg/m$^3$] (compliant with JIS (Japanese Industrial Standard) K 7222: 2005)
  Hardness: from 45 to 160 [N] ("D method" in JIS K6400-2:2012 6.7)
  Elongation: 120% or greater (compliant with JIS K 6400-5:2004)
  Tear strength: from 2 to 12 [N/cm] (compliant with JIS K 6400-5:2004)

The physical properties of the member 52 are within the range described above, and thus tearing of the member 52 without being able to absorb deformation of the side portion S can be suppressed, and adhesion to the receiver coil 18 does not deteriorate. Additionally, the receiver coil 18 can be fixed for an extended period of time while minimizing an increase in mass of the pneumatic tire 10.

Figure 12:
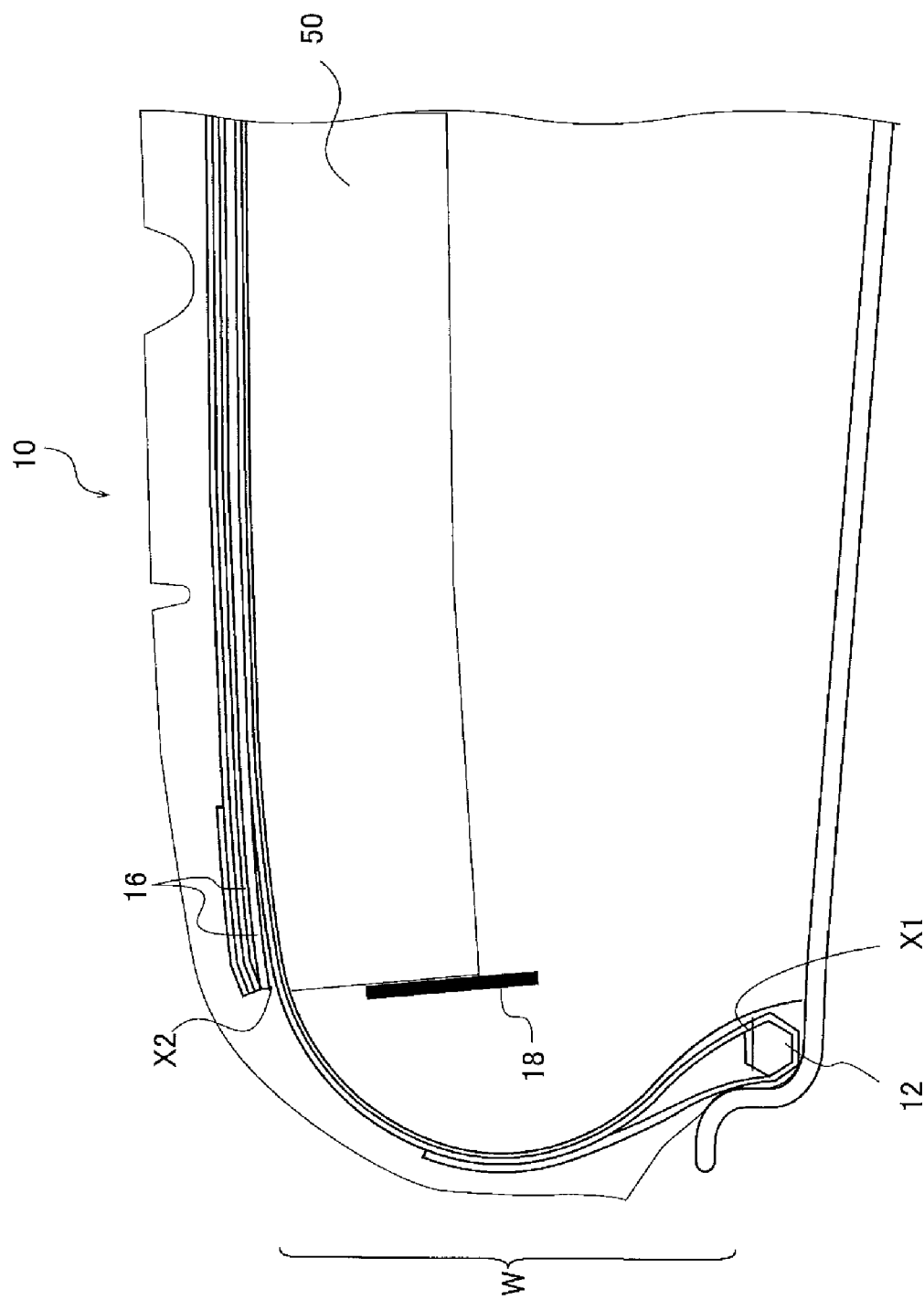
FIG. 12 is a diagram explaining fixation of a receiver coil provided in a pneumatic tire according to an embodiment.

FIG. 12 is a diagram explaining fixation of the receiver coil 18 provided in a pneumatic tire according to an embodiment. As illustrated in FIG. 12, when a sound absorptive member 50 is provided in a region of the tire inner circumferential surface corresponding to the tread portion provided with the tread rubber 40 in the tire cavity region C of the pneumatic tire 10, the receiver coil 18 is preferably provided in a side surface or inside of the sound absorptive member 50. The sound absorptive member 50 is a member that suppresses vibration caused by sparse or dense pressure in the tire cavity region C and thus suppresses noise due to vibration of air in the tire cavity region C. In particular, from a point of effectively suppressing vibration, the sound absorptive member 50 is provided entirely in the tire circumferential direction in a portion of the tire inner circumferential surface corresponding to the tread portion. For example, a foamed material such as foamed urethane, and foamed rubber, or nonwoven fabric can be used as a material of the sound absorptive member 50. A method of fixing the sound absorptive member 50 to the tire inner circumferential surface is not particularly limited. However, the sound absorptive member is fixed with an adhesive. Alternatively, a surface fastener provided prior to vulcanization in a side of the tire inner circumferential surface, and vulcanized to be integrated with the tread portion is connected to a surface fastener provided in the sound absorptive member 50, and thus the sound absorptive member 50 is fixed to the tire inner circumferential surface.

The receiver coil 18 is fixed to the sound absorptive member 50 with an adhesive or the like and thus can be provided in a location separated by the above-described predetermined distance from the bead core 12 and the belt layer 16 in the region W in the tire cavity region C.

According to an embodiment, the receiver coil 18 is provided in woven fabric. In this case, a portion of warp threads and a portion of weft threads of the woven fabric are formed of conductive thread. At this time, the signal line 18*b* of the receiver coil 18 is preferably formed with the conductive thread. The woven fabric is flexible. Thus, even when the receiver coil 18 is provided in a region of the tire inner circumferential surface corresponding to the side portion S, the receiver coil 18 can deform in accordance with vertical deflection deformation of the side portion S, and separation from the tire inner circumferential surface can be prevented. When the woven fabric is provided in the tire inner circumferential surface, the woven fabric is fixed, for example, via an adhesive or a surface fastener.

According to an embodiment, the transmitter coil 100 illustrated in FIG. 1 is preferably provided at a position opposing the side portion S of the pneumatic tire 10 in an unsprung region of a suspension of a vehicle on which the pneumatic tire 10 is mountable. The transmitter coil 100 is disposed in this way, and thus the receiver coil 18 and the transmitter coil 100 can be provided substantially opposing each other. Thus, the receiver coil 18 can efficiently receive an AC magnetic field.

For example, in the case of a strut suspension, the transmitter coil 100 is preferably provided in a damper case, and in the case of a multi-link suspension, the transmitter coil 100 is preferably provided in a knuckle.

Figure 13:
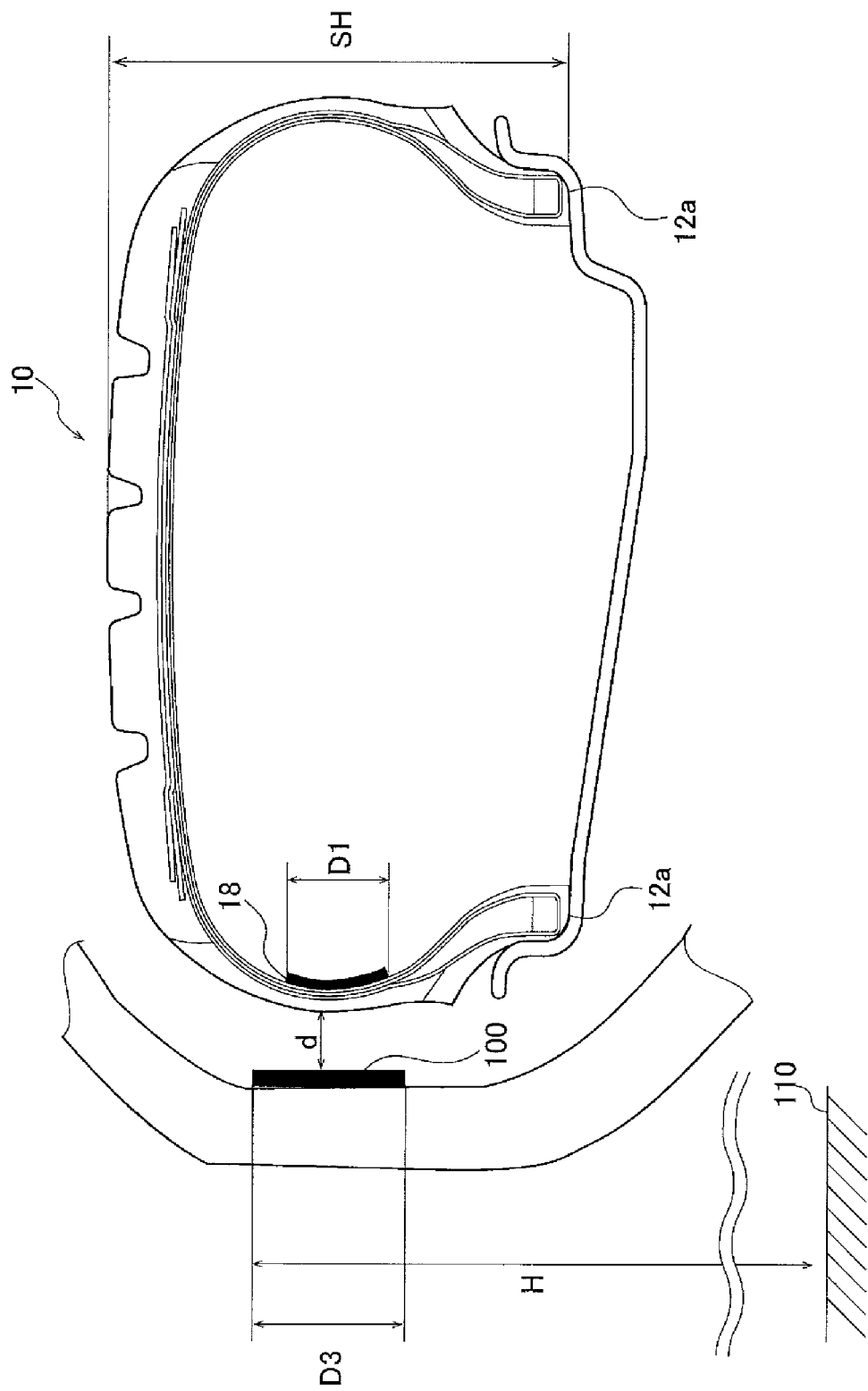
FIG. 13 is a diagram explaining a placement of a receiver coil provided in a pneumatic tire according to an embodiment and a transmitter coil.

FIG. 13 is a diagram explaining a placement of the receiver coil 18 provided in the pneumatic tire 10 according to an embodiment and the transmitter coil 100.

According to an embodiment, the length D1 along the tire radial direction of the receiver coil 18 is preferably 10 to 50% of a tire cross-sectional height SH of the pneumatic tire 10 (a length along the tire radial direction from an innermost end in the tire radial direction of a bead bottom surface 12a of the pneumatic tire 10 to a position of the tire maximum outer diameter). The length D1 is set in this way, and thus the receiver coil can be disposed easily within the region W.

Additionally, according to an embodiment, the single transmitter coil 100 is preferably provided with respect to the single pneumatic tire 10. When a plurality of the transmitter coils 100 are provided adjacent to each other, cross coupling between the transmitter coils 100 adjacent to each other occurs, and thus power supply efficiency is likely to decrease.

Additionally, according to an embodiment, a ratio d/SH of a separation distance d between the transmission region of the transmitter coil 100 and the pneumatic tire 10 to the tire cross-sectional height SH of the pneumatic tire 10 is preferably 0.05 or greater and 0.6 or less. As the tire cross-sectional height SH is smaller, lateral deformation of the side portion S during cornering of the tire is smaller. Thus, even when the transmitter coil 100 is made close to the side portion S, the transmitter coil 100 is less likely to come into contact with the side portion S due to the lateral deformation of the side portion S. Thus, the ratio d/SH is set to be 0.05 or greater and 0.6 or less. Accordingly, the transmitter coil 100 can be made close to the side portion S to the extent that the transmitter coil 100 does not come into contact with the side portion S even when the side portion S laterally deforms. Further, reception by the receiver coil 18 can be performed efficiently. The ratio d/SH is more preferably from 0.08 to 0.5.

According to an embodiment, a resonant frequency at a circuit of the transmitter unit 104 preferably matches a resonant frequency at a circuit of the receiver unit 30. In this case, a frequency of an AC magnetic field generated by the transmitter coil 100 is also the resonant frequency at the circuit of the transmitter unit 104. In this way, transmission efficiency of power is higher than in the magnetic induction method, and the transmission distance is also greater than the transmission distance in the magnetic induction method. Accordingly, the ratio d/SH can be set within the above-described range.

According to an embodiment, when the height of a position of the transmitter coil 100 from the ground with which the pneumatic tire 10 comes into contact is a height H (the height of the position farthest away from a ground 110 of the transmitter coil 100), and the maximum outer diameter of the pneumatic tire 10 is a maximum outer diameter Dmax, a ratio (H/Dmax) of the height H to the maximum outer diameter Dmax and an aspect ratio $\alpha$ [%] of the pneumatic tire 10 preferably satisfy the following formula (1). In other words, the placement position of the transmitter coil 100 at an azimuth angle with respect to a center axis of rotation of the pneumatic tire 10 (an azimuth angle that is an angle of 0 degrees in a direction orthogonal to the ground 110 from the center axis of rotation) is not limited to the position at an azimuth angle of 180 degrees (position opposite to the ground 110), and the placement position of the transmitter coil 100 can variously be set within the range satisfying the following conditions.

$$-7.707 \cdot (\alpha/100)^3 + 12.17 \cdot (\alpha/100)^2 - 4.875 \cdot (\alpha/100) + 0.642 < H/Dmax < 1 \text{ (where } \alpha \text{ is 30 or greater and less than 75),} \quad \text{Formula (1):}$$

0.067<H/Dmax<1 (where $\alpha$ is less than 30), and
0.580<H/Dmax<1 (where $\alpha$ is 75 or greater).

As the aspect ratio $\alpha$ is smaller, lateral deformation of the side portion S during cornering of the tire is smaller. Thus, even when the transmitter coil 100 is made close to the side portion S, the transmitter coil 100 is less likely to come into contact with the side portion S due to the lateral deformation of the side portion S. Further, the lateral deformation of the side portion S is locally generated at or near the ground 110, and the lateral deformation of the side portion S decreases as the side portion S separates from the ground 110. Thus, even when the ratio d/SH is the smallest value of 0.05 in the above-described value range, in the pneumatic tire 10 having a small aspect ratio $\alpha$ at which lateral deformation of the side portion S is small, even when the height H of the transmitter coil 100 from the ground 110 is small (even when the transmitter coil 100 is disposed at a position where the azimuth angle is small), the transmitter coil 100 is not likely to come into contact with the side portion S. In other words, as the aspect ratio $\alpha$ is smaller, a lower limit value of the ratio (H/Dmax) can be made smaller. Accordingly, as the aspect ratio $\alpha$ is smaller, flexibility of the placement position of the transmitter coil 100 is greater.

From this point, the transmitter coil 100 is preferably provided satisfying formula (1) between the aspect ratio $\alpha$ and the ratio (H/Dmax). When the aspect ratio $\alpha$ and the ratio (H/Dmax) do not satisfy formula (1), the transmitter coil 100 is highly likely to come into contact with the side portion S, and thus, this is not preferable.

The pneumatic tire, the pneumatic tire assembly, and the power supply system according to an embodiment of the present technology are described above in detail. However, the pneumatic tire according to an embodiment of the present technology is not limited to the above-described embodiments or examples and may certainly be enhanced or modified in various ways without departing from the scope of the present technology.

The invention claimed is:
1. A pneumatic tire comprising a receiver coil configured to generate power by receiving an AC magnetic field from an outside of the pneumatic tire, the pneumatic tire comprising:
a pair of bead cores each formed in an annular shape of a bead cord made from steel;
a carcass ply layer formed of an organic fiber cord, the carcass ply layer being wound about each of the bead cores and folded back to have a toroidal shape;
a belt layer provided in an outer side of the carcass ply layer in a tire radial direction and formed of a belt cord made from steel; and
a receiver coil formed in a planar shape and provided in a tire cavity region of the pneumatic tire, the receiver coil comprising a receiving region formed in a planar shape and configured to receive an AC magnetic field transmitted through the carcass ply layer, the receiver coil being configured to generate an AC signal by receiving the AC magnetic field,
as the receiver coil is viewed from one side in a tire width direction, a surface of the receiving region of the receiver coil is provided in a region along the tire radial direction interposed between a first portion located in an outermost side of the bead cord in the tire radial direction and a second portion located in an innermost side of the belt layer in the tire radial direction, and the surface of the receiving region faces in the tire width direction, and
when a maximum dimension of the receiving region along the tire radial direction of the receiver coil is a length D1, a distance from the receiving region of the receiver coil to a nearest portion of one of the bead cores to the receiving region of the receiver coil is a distance L1, and a distance from the receiving region of the receiver coil to a nearest portion of the belt layer to the receiving region of the receiver coil is a distance L2, the receiver coil being disposed away from the bead core and the belt layer and the distance L1 and the distance L2 being greater than a distance of one-fourth the length D1.

2. The pneumatic tire according to claim 1, wherein when a distance along the tire radial direction between the first portion and the second portion is a distance L3, the length D1 is 30% or greater of the distance L3.

3. The pneumatic tire according to claim 1, wherein when a maximum dimension of the receiving region of the receiver coil along a tire circumferential direction is a length D2, the length D2 is greater than the length D1.

4. The pneumatic tire according to claim 1, wherein when a tire region as the pneumatic tire is viewed from the tire radial direction is divided into four sections in the tire width direction, a placement position of the receiver coil is located in an outermost divided region at one side in the tire width direction.

5. The pneumatic tire according to claim 1, wherein a plurality of receiver coils each corresponding to the receiver coil are disposed respectively in a plurality of locations in the tire circumferential direction and are separated from each other in the tire circumferential direction and aligned in an entire circumference in the tire circumferential direction, and
a separation distance between receiver coils adjacent in the tire circumferential direction of the plurality of receiver coils is smaller than the length D1.

6. The pneumatic tire according to claim 1, wherein the receiver coil is an element in which a signal line is formed in a spiral shape in a surface of a flexible substrate, and the flexible substrate is provided in a tire inner circumferential surface of the pneumatic tire or in the tire cavity region.

7. The pneumatic tire according to claim 6, wherein the flexible substrate to be provided in the tire inner circumferential surface is a curved substrate formed conforming to a shape of the tire inner circumferential surface, and the signal line is formed in the curved substrate.

8. The pneumatic tire according to claim 1, wherein the receiver coil is provided in a tire inner circumferential surface of the pneumatic tire, and
a region along the tire radial direction of a portion of the receiver coil that is fixed to the tire inner circumferential surface is not overlapped with a position in the tire radial direction of a folded back end of a portion of the carcass ply layer in which the carcass ply layer is folded back around the bead core.

9. The pneumatic tire according to claim 1, wherein the receiver coil is provided via a base material fixed to a tire inner circumferential surface of the pneumatic tire, and
a region along the tire radial direction of a portion of the base material that is fixed to the tire inner circumferential surface is separated from the receiving region of the receiver coil, and is not overlapped with a position in the tire radial direction of a folded back end of a portion in which the carcass ply layer is folded back around the bead core.

10. The pneumatic tire according to claim 1, wherein the receiver coil is provided in woven fabric,
a portion of warp threads and a portion of weft threads of the woven fabric are formed of conductive thread, and
a signal line of the receiver coil is formed with the conductive thread.

11. The pneumatic tire according to claim 1, wherein a sound absorptive member is provided in the tire cavity region of the pneumatic tire, and
the receiver coil is provided in a side surface or inside of the sound absorptive member.

12. The pneumatic tire according to claim 1, wherein the length D1 is 10 to 50% of a tire cross-sectional height SH of the pneumatic tire.

13. A pneumatic tire assembly of a pneumatic tire mounted on a wheel, the pneumatic tire assembly comprising an element configured to receive power by receiving an AC magnetic field from an outside of the pneumatic tire,
the pneumatic tire comprising:
a pair of bead cores each formed in an annular shape of a bead cord made from steel;
a carcass ply layer formed of an organic fiber cord, the carcass ply layer being wound about each of the bead cores and folded back to have a toroidal shape; and
a belt layer provided in an outer side of the carcass ply layer in a tire radial direction and formed of a belt cord made of steel,
the wheel comprising a receiver coil formed in a planar shape and provided being fixed to a wheel surface facing a tire cavity region of the pneumatic tire, the receiver coil comprising a receiving region formed in a planar shape and configured to receive an AC magnetic field transmitted through the carcass ply layer, the receiver coil being configured to generate an AC signal,
the pneumatic tire or the wheel comprising an element fixed to the wheel surface facing the tire cavity region or to a tire inner circumferential surface of the pneumatic tire, the element being configured to receive power converted from the AC signal and be driven by the power,
as the receiver coil is viewed from one side in a tire width direction, a surface of the receiving region of the receiver coil being provided in a region along the tire radial direction interposed between a first portion located in an outermost side of the bead cord in the tire radial direction and a second portion located in an innermost side of the belt layer in the tire radial direction, and the surface of the receiving region facing in the tire width direction, and when a maximum dimension of the receiving region along the tire radial direction of the receiver coil is a length D1, a distance from the receiving region of the receiver coil to a nearest portion of one of the bead cores to the receiving region of the receiver coil is a distance L1, and a distance from the receiving region of the receiver coil to a nearest portion of the belt layer to the receiving region of the receiver coil is a distance L2, the receiver coil being disposed away from the bead core and the belt layer and the distance L1 and the distance L2 being greater than a distance of one-fourth the length D1.

14. A power supply system configured to wirelessly transmit power from a transmitter unit to a receiver unit provided in a pneumatic tire and supply power to an element provided in the receiver unit,
the transmitter unit comprising a transmitter coil provided in a base portion non-rotational with respect to the pneumatic tire, the transmitter coil comprising a transmission region configured to generate and transmit an AC magnetic field,
the pneumatic tire comprising:
a pair of bead cores each formed in an annular shape of a steel bead cord;
a carcass ply layer formed of an organic fiber cord, the carcass ply layer being wound about each of the bead cores and folded back to have a toroidal shape; and
a belt layer provided in an outer side of the carcass ply layer in a tire radial direction and formed of a steel belt cord,
the receiver unit provided in the pneumatic tire, the receiver unit comprising:
a receiver coil formed in a planar shape and provided in a tire cavity region of the pneumatic tire, the receiver coil comprising a receiving region formed in a planar shape and configured to receive the AC magnetic field transmitted through the carcass ply layer, the receiver coil being configured to generate an AC signal by receiving the AC magnetic field; and
an element configured to receive power converted from the AC signal and be driven by the power,
as the receiver coil is viewed from one side in a tire width direction, a surface of the receiving region of the receiver coil being provided in a region in the tire radial direction interposed between a first portion located in an outermost side of the bead cord in the tire radial direction, and a second portion located in an innermost side of the belt layer in the tire radial direction, and the surface of the receiving region facing in the tire width direction, and
when a maximum dimension of the receiving region along the tire radial direction of the receiver coil is a length D1, a distance from the receiving region of the receiver coil to a nearest portion of one of the bead cores to the receiving region of the receiver coil is a distance L1, and a distance from the receiving region of the receiver coil to a nearest portion of the belt layer to the receiving region of the receiver coil is a distance L2, the receiver coil being disposed away from the bead core and the belt layer and the distance L1 and the distance L2 being greater than a distance of one-fourth the length D1.

15. The power supply system according to claim 14, wherein when a length of a dimension along the tire radial direction of the transmission region of the transmitter coil is a length D3, the length D3 is greater than the length D1.

16. The power supply system according to claim 14, wherein when a length of a dimension along a tire circumferential direction of the transmission region of the transmitter coil is a length D4, and a maximum dimension of the receiving region along the tire circumferential direction of the receiver coil is a length D2, the length D4 is smaller than the length D2.

17. The power supply system according to claim 14, wherein a plurality of receiver coils each corresponding to the receiver coil are disposed respectively in a plurality of locations in the tire circumferential direction to be separated from each other in the tire circumferential direction and aligned in an entire circumference in the tire circumferential direction, and
a separation distance between the receiver coils adjacent in the tire circumferential direction of the plurality of receiver coils is smaller than the length D4 of the dimension along the tire circumferential direction of the transmission region of the transmitter coil.

18. The power supply system according to claim 14, wherein a ratio d/SH of a separation distance d between the transmission region of the transmitter coil and the pneumatic tire to a tire cross-sectional height SH of the pneumatic tire is 0.05 or greater and 0.6 or less.

19. The power supply system according to claim 14, wherein when a height of a position of the transmitter coil from a ground with which the pneumatic tire comes into contact is a height H, and a maximum outer diameter of the pneumatic tire is a maximum outer diameter Dmax, a ratio (H/Dmax) of the height H to the maximum outer diameter Dmax and an aspect ratio α [%] of the pneumatic tire satisfy formula (1), $$-7.707 \cdot (\alpha/100)^3 + 12.17 \cdot (\alpha/100)^2 - 4.875 \cdot (\alpha/100) + 0.642 < H/Dmax < 1, \text{ where } \alpha \text{ is 30 or greater and less than 75,} \quad \text{Formula (1):}$$

$0.067 < H/Dmax < 1$, where α is less than 30, and
$0.580 < H/Dmax < 1$, where α is 75 or greater.

20. The power supply system according to claim 14, wherein a resonant frequency at a circuit of the transmitter unit matches a resonant frequency at a circuit of the receiver unit.

21. The power supply system according to claim 14, wherein wireless transmission of power from the transmitter unit to the receiver unit is performed by a magnetic field resonance method.

22. The power supply system according to claim 14, wherein the transmitter coil is provided at a position opposing a side portion of the pneumatic tire in an unsprung region of a suspension of a vehicle on which the pneumatic tire is mountable.

23. The power supply system according to claim 14, wherein the single transmitter coil is provided per the pneumatic tire, as an only transmitter.

* * * * *